United States Patent
Takano

(10) Patent No.: US 10,862,550 B2
(45) Date of Patent: *Dec. 8, 2020

(54) MULTIPLE-INPUT MULTIPLE-OUTPUT (MIMO) APPARATUS

(71) Applicant: Sony Corporation, Tokyo (JP)

(72) Inventor: Hiroaki Takano, Saitama (JP)

(73) Assignee: Sony Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/808,402

(22) Filed: Mar. 4, 2020

(65) Prior Publication Data

US 2020/0204219 A1 Jun. 25, 2020

Related U.S. Application Data

(63) Continuation of application No. 16/398,298, filed on Apr. 30, 2019, now Pat. No. 10,630,350, which is a
(Continued)

(30) Foreign Application Priority Data

Mar. 24, 2015 (JP) ................. 2015-061308

(51) Int. Cl.
| | | |
|---|---|---|
| *H04B 7/02* | (2018.01) | |
| *H04B 7/0413* | (2017.01) | |
| *H04W 16/28* | (2009.01) | |
| *H04B 7/0456* | (2017.01) | |
| *H04B 7/06* | (2006.01) | |
| *H04W 72/04* | (2009.01) | |
| *H04W 72/06* | (2009.01) | |

(52) U.S. Cl.
CPC ......... *H04B 7/0413* (2013.01); *H04B 7/0473* (2013.01); *H04B 7/063* (2013.01);
(Continued)

(58) Field of Classification Search
CPC .. H04B 7/0413; H04B 7/0617; H04B 7/0639; H04B 7/063; H04B 7/0473;
(Continued)

(56) References Cited

U.S. PATENT DOCUMENTS

2014/0192762 A1   7/2014 Li et al.
2016/0065282 A1*  3/2016 Zhang .................. H04W 16/10
                                                                     370/281
(Continued)

FOREIGN PATENT DOCUMENTS

CN    103974315 A   8/2014
JP    2014-53811 A  3/2014
(Continued)

OTHER PUBLICATIONS

Extended Search Report issued in European Application 16768204.6-1220 dated Nov. 7, 2018.
(Continued)

*Primary Examiner* — Dhaval V Patel
(74) *Attorney, Agent, or Firm* — Xsensus, LLP

(57) ABSTRACT

An apparatus is disclosed that includes a processor configured to acquire subarray information indicating a plurality of subarrays usable for multilayer Multi-Input Multi-Output (MIMO), notify a terminal apparatus of information related to the subarray, wherein the terminal apparatus is a terminal apparatus that performs a report related to a combination of two or more subarrays included in the plurality of subarrays, and wherein the plurality of subarrays includes two or more subarrays that share one or more antenna ports.

17 Claims, 24 Drawing Sheets

Related U.S. Application Data continuation of application No. 15/542,482, filed as application No. PCT/JP2016/054020 on Feb. 10, 2016, now Pat. No. 10,312,975.

(52) U.S. Cl.
CPC ......... *H04B 7/0617* (2013.01); *H04B 7/0626* (2013.01); *H04B 7/0639* (2013.01); *H04W 16/28* (2013.01); *H04W 72/042* (2013.01); *H04W 72/046* (2013.01); *H04W 72/06* (2013.01)

(58) Field of Classification Search
CPC .. H04B 7/0626; H04W 16/28; H04W 72/046; H04W 72/042; H04W 72/06
See application file for complete search history.

(56) References Cited

U.S. PATENT DOCUMENTS

| | | | |
|---|---|---|---|
| 2016/0165457 A1 | 6/2016 | Inoue et al. | |
| 2016/0183275 A1 | 6/2016 | Inoue et al. | |
| 2016/0380734 A1* | 12/2016 | Wang | H04B 7/0626 370/329 |
| 2018/0091207 A1 | 3/2018 | Kakishima et al. | |

FOREIGN PATENT DOCUMENTS

| | | |
|---|---|---|
| JP | 2014-64294 A | 4/2014 |
| JP | 2014-204305 A | 10/2014 |
| JP | 2015-33097 A | 2/2015 |
| JP | 2016-517226 A | 6/2016 |
| WO | 2014/126319 A1 | 8/2014 |
| WO | 2014/157867 A1 | 10/2014 |
| WO | 2014/168315 A1 | 10/2014 |
| WO | 2014/168317 A1 | 10/2014 |
| WO | 2015/019775 A1 | 2/2015 |
| WO | 2016/047505 A1 | 3/2016 |

OTHER PUBLICATIONS

International Search Report and Written Opinion dated May 10, 2016 in PCT/JP2016/054020 filed Feb. 10, 2016.
Japanese Office Action dated Feb. 25, 2020 in Japanese Application No. 2017-507586.
Extended European Search Report dated Jul. 2, 2020 in European Application No. 19212995.5.

* cited by examiner

FIG. 7
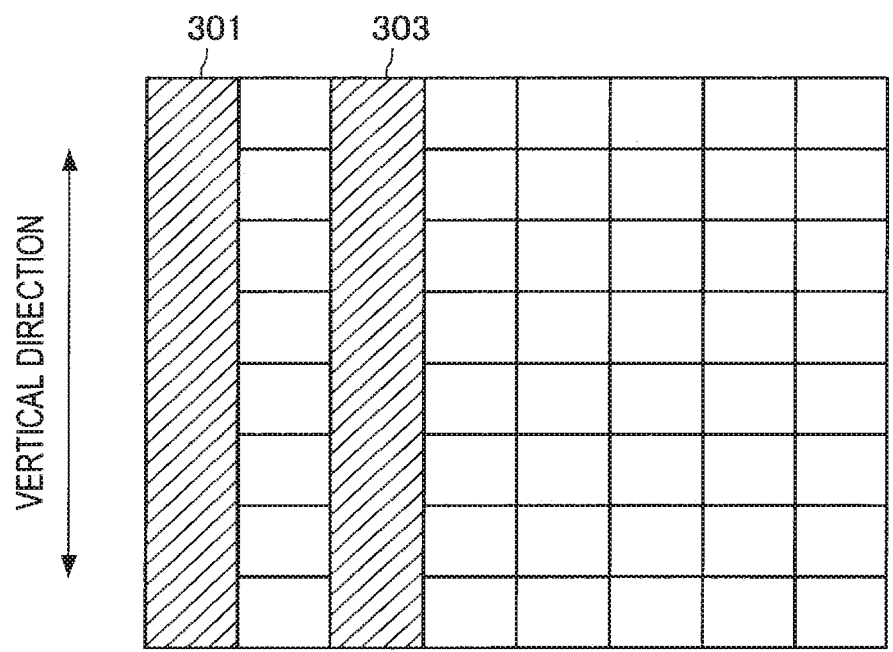
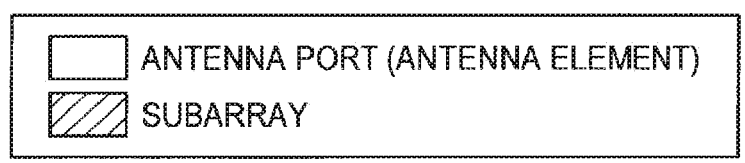

FIG. 10
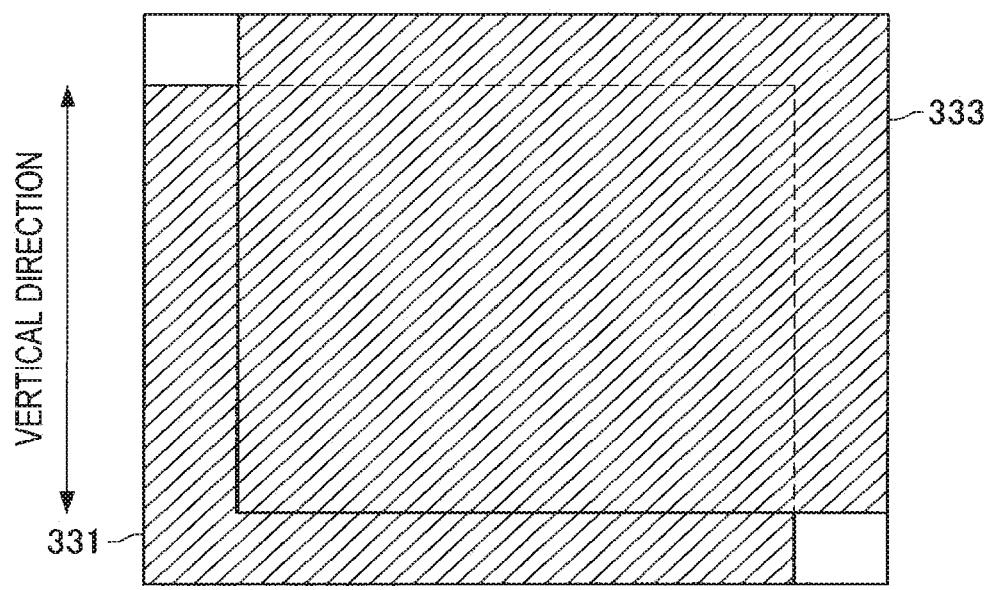
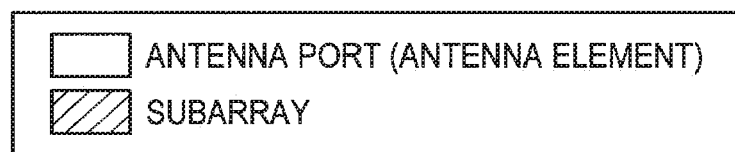

FIG. 18
| SUBARRAY | GROUP |
|---|---|
| 1 | 1 |
| 2 | 1 |
| 3 | 2 |
| 4 | 2 |
| 5 | 3 |
| 6 | 3 |
FIG. 19
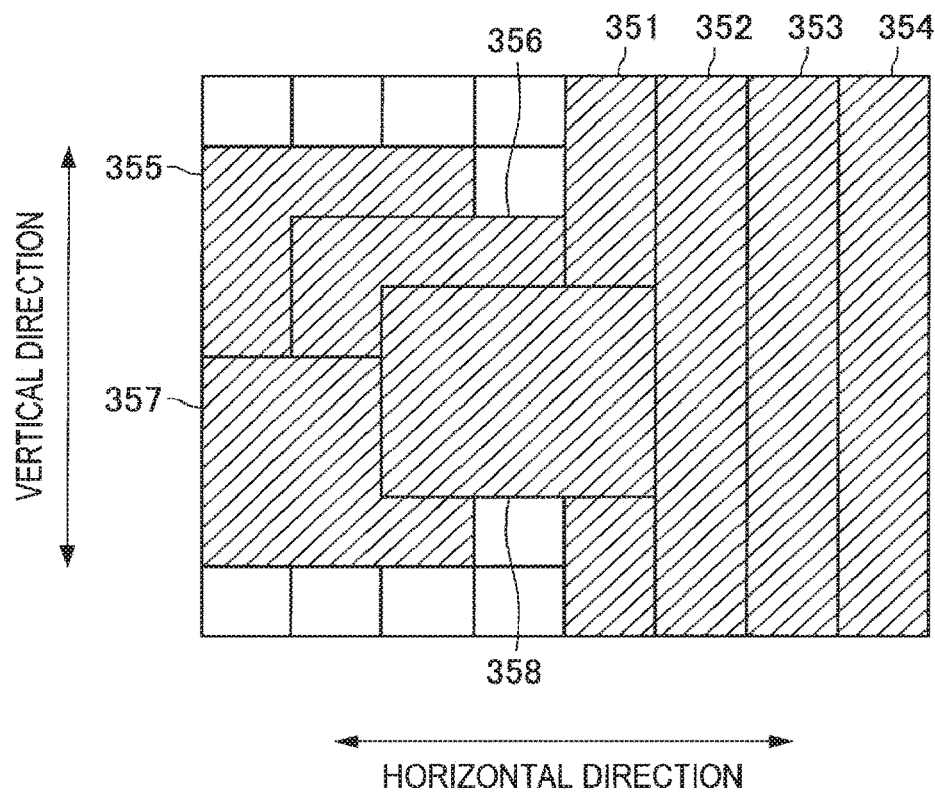
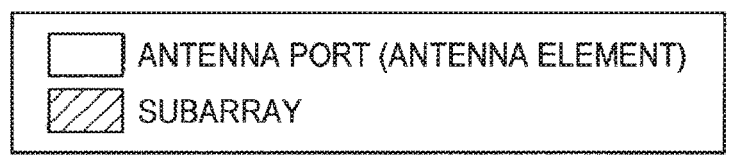

FIG. 20

| SUBARRAY | GROUP |
|---|---|
| 1 | 1 |
| 2 | 1 |
| 3 | 1 |
| 4 | 1 |
| 5 | 2 |
| 6 | 2 |
| 7 | 2 |
| 8 | 2 |

| SUBARRAY | GROUP |
|---|---|
| 1 | 1 |
| 2 | 1 |
| 3 | 1 |
| 4 | 2 |
| 5 | 2 |
| 6 | 2 |

MULTIPLE-INPUT MULTIPLE-OUTPUT (MIMO) APPARATUS

CROSS-REFERENCE TO RELATED APPLICATIONS

The present application is a continuation of U.S. application Ser. No. 16/398,298, filed Apr. 30, 2019, which is a continuation of U.S. application Ser. No. 15/542,482, filed Jul. 10, 2017 (now U.S. Pat. No. 10,312,975), which is based on PCT filing PCT/JP2016/054020, filed Feb. 10, 2016, and claims priority to JP 2015-061308, filed Mar. 24, 2015, the entire contents of each are incorporated herein by reference.

TECHNICAL FIELD

The present disclosure relates to apparatuses.

BACKGROUND ART

In the Third Generation Partnership Project (3GPP), various techniques for improving the capacity of a cellular system are currently studied in order to accommodate explosively increasing traffic. It is also envisaged that the required capacity will become about 1000 times the current capacity in the future. Techniques such as multi-user multi-input multiple-output (MU-MIMO), coordinated multipoint (CoMP), and the like could increase the capacity of a cellular system by a factor of as low as less than ten. Therefore, there is a demand for an innovative technique.

For example, as a technique for significantly increasing the capacity of a cellular system, a base station may perform beamforming using a directional antenna including a large number of antenna elements (e.g., about 100 antenna elements). Such a technique is a kind of technique called large-scale MIMO, massive MIMO, or free dimension(FD)-MIMO. By such beamforming, the half-width of a beam is narrowed. In other words, a sharp beam is formed. Also, if the large number of antenna elements are arranged in a plane, a beam aimed in a desired three-dimensional direction can be formed.

For example, Patent Literatures 1 to 3 disclose techniques applied when a directional beam aimed in a three-dimensional direction is used.

CITATION LIST

Patent Literature

Patent Literature 1: JP 2014-204305A
Patent Literature 2: JP 2014-53811A
Patent Literature 3: JP 2014-64294A

DISCLOSURE OF INVENTION

Technical Problem

In the 3GPP standard, a subarray for multilayer MIMO (that is, transmission to a terminal apparatus in two or more layers) is uniquely decided. On the other hand, when the number of antenna ports increases with an increase in the number of antenna elements as in the case of large-scale MIMO, a degree of freedom increases, and various subarrays can be constructed. Further, various combinations of subarrays can be used as an array antenna system. Further, a combination of subarrays desired to be used (that is, an array antenna system desired to be used) may differ depending on a terminal apparatus. Nonetheless, when the subarray is uniquely decided as in the related art, a subarray which is undesirable for the terminal apparatus may be used in multilayer MIMO. As a result, a communication speed or a communication quality of the terminal apparatus may be lowered.

In this regard, it is desirable to provide a mechanism that makes it possible to use a combination of subarrays desirable for multilayer MIMO.

Solution to Problem

According to the present disclosure, there is provided an apparatus, including: an acquiring unit configured to acquire subarray information indicating a plurality of subarrays usable for multilayer Multi-Input Multi-Output (MIMO); and a control unit configured to notify a terminal apparatus of the subarray information.

Further, according to the present disclosure, there is provided an apparatus, including: an acquiring unit configured to acquire subarray information indicating a plurality of subarrays usable for multilayer MIMO; and a control unit configured to perform a report related to a combination of two or more subarrays included in the plurality of subarrays.

Advantageous Effects of Invention

As described above, according to the present disclosure it is possible to use a combination of subarrays desirable for multilayer MIMO. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 7 is an explanatory diagram for describing a first example of a subarray.

FIG. 10 is an explanatory diagram for describing a fourth example of a subarray.

FIG. 18 is a second explanatory diagram for describing a first example of a group of subarrays.

FIG. 19 is a first explanatory diagram for describing a second example of a group of subarrays.

FIG. 20 is a second explanatory diagram for describing a second example of a group of subarrays.

MODE(S) FOR CARRYING OUT THE INVENTION

Figure 1:
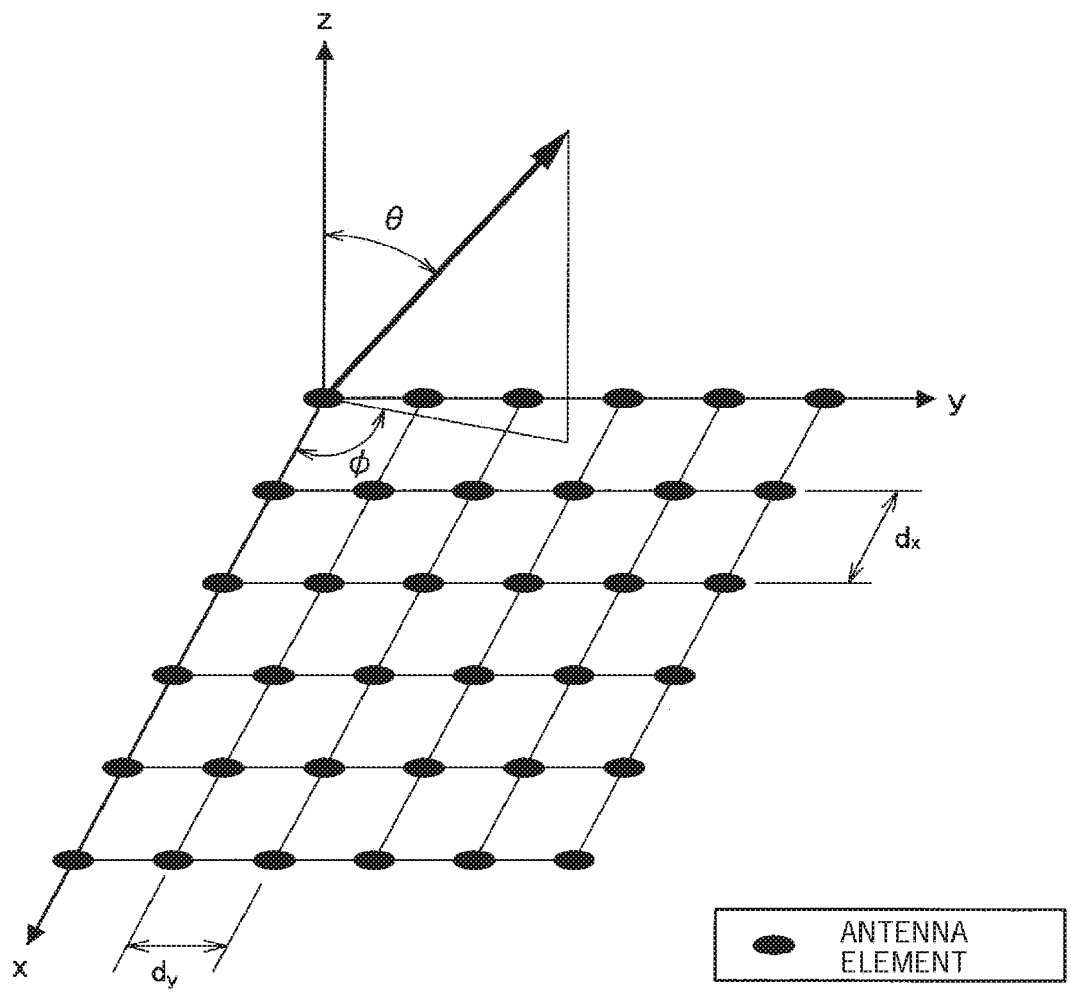
FIG. 1 is a diagram for describing a weight set for large-scale MIMO beamforming.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Further, description will proceed in the following order.
1. Introduction
1.1. Relevant technology
1.2. Technical problems
2.2. Schematic configuration of system
3. Configuration of each apparatus
3.1. Configuration of base station
3.2. Configuration of terminal apparatus
4. Technical features
5. Processing flow
6. Modified examples
6.1. First modified example
6.2. Second modified example
6.3. Third modified example
7. Application examples
7.1. Application examples for base station
7.2. Application examples for terminal apparatus
8. Conclusion

1. Introduction

First, a relevant technology and technical features thereof according to an embodiment of the present disclosure will be described with reference to FIGS. 1 and 2.

1.1. Relevant Technology

Beam forming and an antenna port will be described with reference to FIGS. 1 and 2 as a relevant technology according to the embodiment of the present disclosure.

(1) Beam Forming (a) Necessity of Large-Scale MIMO

In the 3GPP, various techniques for improving the capacity of a cellular system are currently studied in order to accommodate explosively increasing traffic. It is envisaged that the required capacity will become about 1000 times the current capacity in the future. Techniques such as MU-MIMO, CoMP, and the like could increase the capacity of a cellular system by a factor of as low as less than ten. Therefore, there is a demand for an innovative technique.

Release 10 of the 3GPP specifies that evolved eNode B is equipped with eight antennas. Therefore, the antennas can provide eight-layer MIMO in the case of single-user multi-input multiple-input multiple-output (SU-MIMO). Eight-layer MIMO is a technique of spatially multiplexing eight separate streams. Alternatively, the antennas can provide four-user two-layer MU-MIMO.

User equipment (UE) has only a small space for accommodating an antenna, and limited processing capability, and therefore, it is difficult to increase the number of antenna elements in the antenna of UE. However, recent advances in antenna mounting technology have allowed eNode B to accommodate a directional antenna including about 100 antenna elements.

For example, as a technique for significantly increasing the capacity of a cellular system, a base station may perform beamforming using a directional antenna including a large number of antenna elements (e.g., about 100 antenna elements). Such a technique is a kind of technique called large-scale MIMO or massive MIMO. By such beamforming, the half-width of a beam is narrowed. In other words, a sharp beam is formed. Also, if the large number of antenna elements are arranged in a plane, a beam aimed in a desired three-dimensional direction can be formed. For example, it has been proposed that, by forming a beam aimed at a higher position than that of a base station (e.g., a higher floor of a high-rise building), a signal is transmitted to a terminal apparatus located at that position.

In typical beamforming, it is possible to control a direction of a beam in the horizontal direction. Therefore, the typical beamforming can be regarded as two-dimensional beamforming. On the other hand, in beamforming of large-scale MIMO (or massive MIMO), it is possible to control a direction of a beam in the vertical direction in addition to the horizontal direction. In other words, it is possible to form a three-dimensional beam having desired directivity in the horizontal direction and the vertical direction. Therefore, beamforming of large-scale MIMO can be regarded as 3-dimensional beamforming. For example, a three-dimensional beam can be formed using antenna elements which are arranged two dimensionally.

Note that the increase in the number of antennas allows for an increase in the number of MU-MIMO users. Such a technique is another form of the technique called large-scale MIMO or massive MIMO. Note that when the number of antennas in UE is two, the number of spatially separated streams is two for a single piece of UE, and therefore, it is more reasonable to increase the number of MU-MIMO users than to increase the number of streams for a single piece of UE.

(b) Weight Set

A set of weight for beamforming are represented by a complex number (i.e., a set of weight coefficients for a plurality of antenna elements). An example of a weight set particularly for large-scale MIMO beamforming will now be described with reference to FIG. 1.

Figure 2:
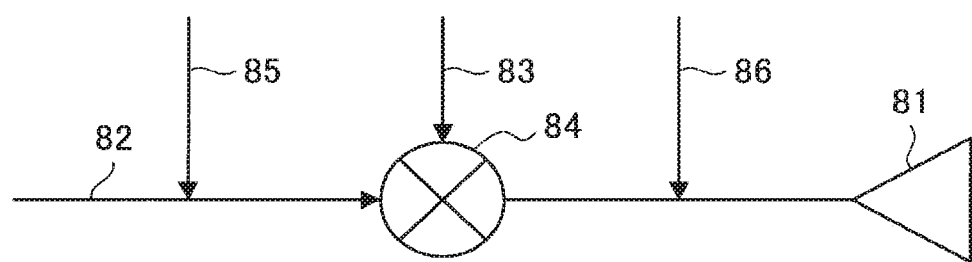
FIG. 2 is a diagram for describing a relationship between multiplication of weight coefficients and insertion of a reference signal.

FIG. 1 is a diagram for describing a weight set for large-scale MIMO beamforming. FIG. 1 shows antenna elements arranged in a grid pattern. FIG. 1 also shows two orthogonal axes x and y in a plane in which the antenna elements are arranged, and an axis z perpendicular to the plane. Here, the direction of a beam to be formed is, for example, represented by an angle phi (Greek letter) and an angle theta (Greek letter). The angle phi (Greek letter) is an angle between an xy-plane component of the direction of a beam and the x-axis. Also, the angle theta (Greek letter) is an angle between the beam direction and the z-axis. In this case, for example, the weight coefficient $V_{m,n}$ of an antenna element which is m-th in the x-axis direction and n-th in the y-axis direction is represented as follows.

$$V_{m,n}(\theta, \varphi, f) = \exp\left(j2\pi\frac{f}{c}\{(m-1)d_x\sin(\theta)\cos(\varphi) + (n-1)d_y\sin(\theta)\sin(\varphi)\}\right) \quad [\text{Math. 1}]$$

In formula (1), f is a frequency, and c is the speed of light. Also, j is the imaginary unit of a complex number. Also, $d_x$ is an interval between each antenna element in the x-axis direction, and $d_y$ is an interval between each antenna element in the y-axis direction. Note that the coordinates of an antenna element are represented as follows.

$$x=(m-1)d_x, y=(n-1)d_y \quad [\text{Math. 2}]$$

A weight set for typical beamforming (two-dimensional beamforming) can be split into a weight set for obtaining directivity in the horizontal direction and a weight set for phase adjustment of multilayer MIMO (for example, dual layer MIMO) (for example, a weight set for phase adjustment between two antenna sub arrays corresponding to different polarized waves). On the other hand, a weight set for beamforming of large-scale MIMO (three-dimensional beamforming) can be split into a first weight set for obtaining directivity in the horizontal direction, a second weight set for obtaining directivity in the vertical direction, and a third weight set for phase adjustment of multilayer MIMO (for example, dual layer MIMO). For example, the third weight set is a weight set for phase adjustment between sub arrays. Further, when transmission is performed in a single layer, the weight set for phase adjustment of multilayer MIMO (for example, dual layer MIMO) may not be included.

(c) Reception of Signal

For demodulation of a signal transmitted over a directional beam, an evolved Node B (eNB) transmits a DMRS along with a data signal in the downlink. The DMRS is a sequence known to the UE and is multiplied by a set of weight coefficients for beamforming (which is the same as a set of weight coefficients multiplied by a data signal). The UE restores a phase and an amplitude of the data signal on the basis of a reception result of the DMRS, and demodulates and decodes the data signal.

(d) Difference of CRS and CSI-RS with DMRS

In LTE, in addition to the DMRS, there are reference signals such as a cell-specific reference signal (CRS) and a channel state information reference signal (CSI-RS). The CRS and the CSI-RS are not used for demodulation of the data signal but are mainly used for measuring a channel quality. Specifically, the CRS is used for cell selection, and the CSI-RS is used for determining a modulation scheme. Therefore, according to the current standard, the CRS and the CSI-RS are not transmitted by a directional beam but transmitted by non-directional radio waves.

Note that the CRS and/or the CSI-RS may be transmitted by a directional beam. Depending on a system design concept at that time, the CRS and/or the CSI-RS is transmitted by the non-directional radio wave or is transmitted by the directional beam.

On the other hand, since the DMRS is transmitted for demodulation of the data signal transmitted by the directional beam, it is similarly transmitted by the directional beam.

An example of multiplication of the reference signal and the weight coefficient will be described with reference to FIG. 2. FIG. 2 is a diagram for describing the relationship between multiplication of weight coefficients and insertion (or mapping) of a reference signal. Referring to FIG. 2, a transmission signal 82 corresponding to each antenna element 81 is complex-multiplied by a weight coefficient 83 by a multiplier 84. Thereafter, the transmission signal 82 complex-multiplied by the weight coefficient 83 is transmitted from the antenna element 81. Also, a DR-MS 85 is inserted before the multiplier 84, and is complex-multiplied by the weight coefficient 83 by the multiplier 84. Thereafter, the DR-MS 85 complex-multiplied by the weight coefficient 83 is transmitted from the antenna element 81. Meanwhile, a CRS 86 (and a CSI-RS) is inserted after the multiplier 84. Thereafter, the CRS 86 (and the CSI-RS) is transmitted from the antenna element 81 without being multiplied by the weight coefficient 83.

(2) Antenna port (a) Virtual Antenna

In LTE, instead of a physical antenna/antenna element, a virtual antenna such as an antenna port is prepared. The antenna port corresponds to one or more physical antennas or antenna elements, but a specific correspondence relation between the antenna port and the antenna/antenna element depends on an implementation and has a degree of freedom. For example, one antenna port may correspond to one antenna (for example, one normal antenna or one array antenna). Further, for example, one antenna port may correspond to one antenna element (or a plurality of antenna elements) included in an array antenna.

(b) Resources Associated with Antenna Port

As described above, for example, for a plurality of antenna ports, a plurality of orthogonal resources are prepared and used for transmission of the DMRS. For example, the eNB transmits the DMRS in first resources using a first antenna port (for example, the antenna port 10) and transmits the DMRS in second resources orthogonal to the first resources using a second antenna port (for example, the antenna port 11).

Here, "resources" indicate, for example, a combination of time/frequency resources and a code sequence, and that resources associated with one arbitrary antenna port and resources associated with other antenna ports are orthogonal to each other. In other words, the resources associated with any one antenna port and the resources associated with another antenna port differ in at least one of the time/ frequency resources and the code sequence.

(c) Reason for preparing orthogonal resources Since each antenna port corresponds to an antenna/antenna element located at a spatially different position, a spatially independent channel is obtained between the eNB and the UE. Before the orthogonal channel is obtained, it is necessary to estimate a channel characteristic on the basis of the reference signal (for example, the CSI-RS). Since it is difficult to estimate a channel characteristic when interference with the reference signal occurs, orthogonal resources (that is, different resources) are prepared for each antenna port so that interference does not occur between the reference signals transmitted using different antenna ports.

For example, the eNB includes 64 antennas (for example, virtually 64 antenna ports), and the UE includes eight antennas as well. In this case, a channel matrix H (64×8) is calculated. Then, a general inverse matrix of the channel matrix H is calculated, and eight spatially independent channels are obtained by multiplying reception data by the general inverse matrix from the left side. Particularly, in order to properly calculate the channel matrix H, orthogonal resources (that is, different resources) are prepared for each of 64 antenna ports so that no interference occurs between the reference signals transmitted using the 64 antenna ports.

(d) Decision of Channel State Information

The UE decides a precoding matrix indicator (PMI), a rank indicator (RI), and/or a channel quality indicator (CQI) on the basis of the channel matrix. The information is referred to as channel state information. The UE feeds the information back to the eNB.

1.2. Technical Problems

In the 3GPP standard, the subarray for multilayer MIMO (that is, transmission to a terminal apparatus in two or more layers) is uniquely decided. More specifically, for example, the eNB transmits the CSI-RS using eight antenna ports (antenna ports 15 to 22), and the UE including two antennas acquires a 2×8 channel matrix on the basis of the CSI-RS. Then, the UE decides a PMI indicating the precoding matrix on the basis of the channel matrix. At this time, the UE regards the eight antenna ports as two subarrays each including four antenna ports, and decides the PMI. Thus, the subarray is uniquely decided.

On the other hand, when the number of antenna ports increases with an increase in the number of antenna elements as in the case of large-scale MIMO (for example, 64 antenna elements and 64 antenna ports), a degree of freedom increases, and various subarrays can be constructed. Further, various combinations of subarrays can be used as the array antenna system. Further, a combination of subarrays desired to be used (that is, an array antenna system desired to be used) may differ depending on a terminal apparatus. Nonetheless, when the subarray is uniquely decided as in the related art, a subarray undesirable for the terminal apparatus may be used in multilayer MIMO. As a result, a communication speed or a communication quality of the terminal apparatus may be lowered.

In this regard, it is desirable to provide a mechanism that makes it possible to use a combination of subarrays desirable for multilayer MIMO.

2. Schematic Configuration of System

Figure 3:
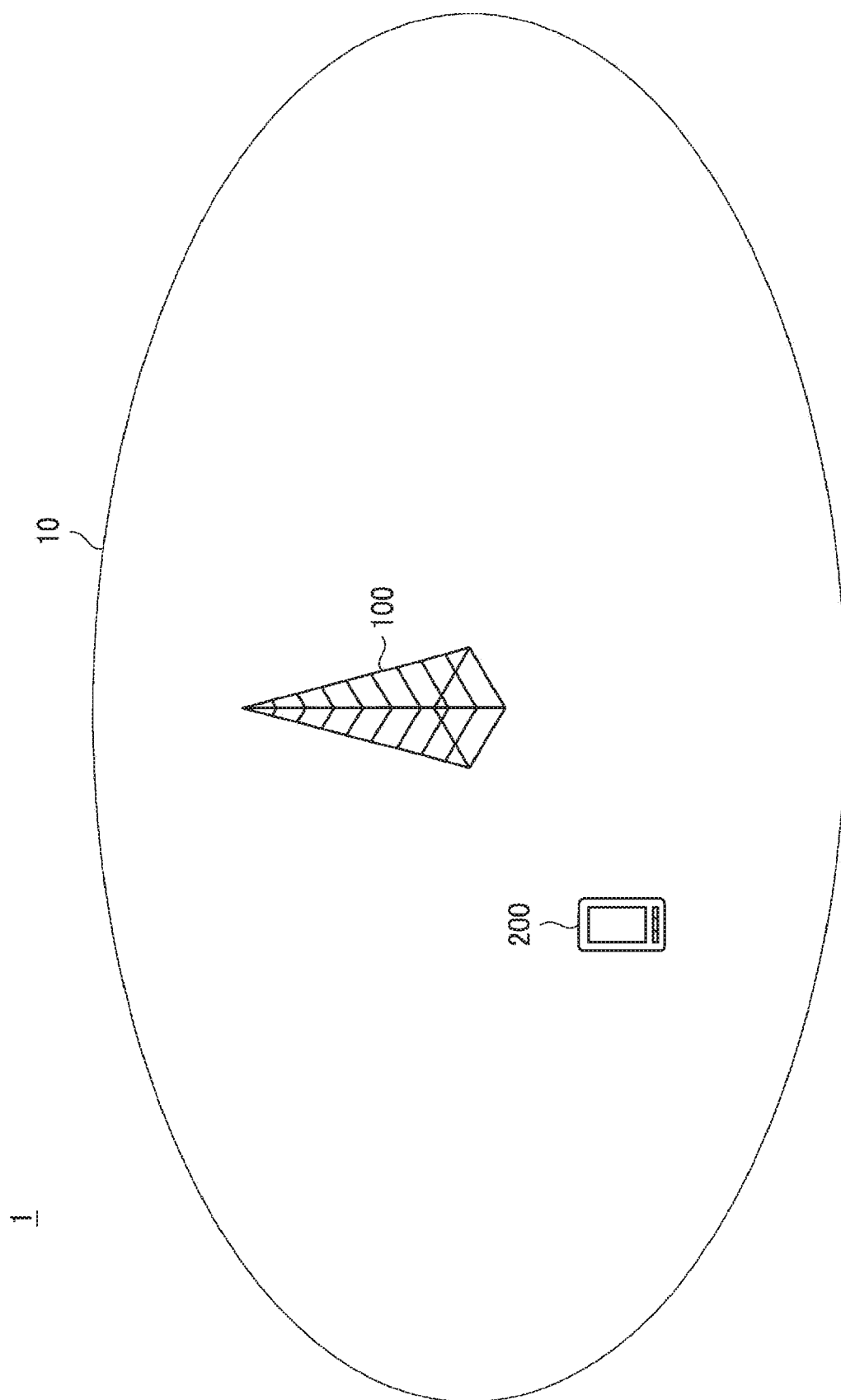
FIG. 3 is an explanatory diagram illustrating an example of a schematic configuration of a system according to an embodiment of the present disclosure.

Next, a schematic configuration of a communication system 1 according to an embodiment of the present disclosure will be described with reference to FIG. 3. FIG. 3 is a diagram for describing an example of the schematic configuration of the communication system 1 according to an embodiment of the present disclosure. Referring to FIG. 3, the system 1 includes a base station 100 and terminal apparatuses 200. The system 1 is a system which complies with, for example, LTE, LTE-Advanced, or similar communication standards.

(1) Base Station 100

The base station 100 performs wireless communication with the terminal apparatuses 200. For example, the base station 100 performs wireless communication with the terminal apparatuses 200 located in a cell 101 of the base station 100.

Particularly, in the embodiment of the present disclosure embodiment, the base station 100 supports multilayer MIMO. In other words, the base station 100 transmits a signal to the terminal apparatus 200 in two or more layers. For the transmission in the two or more layers, the base station 100 uses an array antenna system which is a combination of sub arrays which are equal in number to the number of layers of the two or more layers (or larger than the number of layers).

For example, the base station 100 includes a directional antenna and performs multilayer beam forming as multilayer MIMO. In other words, the base station 100 transmits a signal to the terminal apparatus 200 by a directional beam in two or more layers.

Further, for example, the base station 100 includes a directional antenna having a number of antenna elements and supports large-scale MIMO (in other words, massive MIMO, FD-MIMO, or the like). For example, the base station 100 transmits a signal to the terminal apparatus 200 by a directional beam having directivity in both the horizontal direction and the vertical direction (that is, a three-dimensional beam) as beam forming of large-scale MIMO (that is, beam forming of massive MIMO or FD-MIMO or three-dimensional beam forming).

(2) Terminal Apparatus 200

The terminal apparatus 200 performs wireless communication with the base station 100. For example, the terminal apparatus 200 performs wireless communication with the base station 100 when located in the cell 101 of the base station 100.

Particularly, in the embodiment of the present disclosure, the terminal apparatus 200 supports multilayer MIMO. In other words, the terminal apparatus 200 transmits a signal from the base station 100 in two or more layers.

3. Configuration of Each Apparatus

Figure 4:
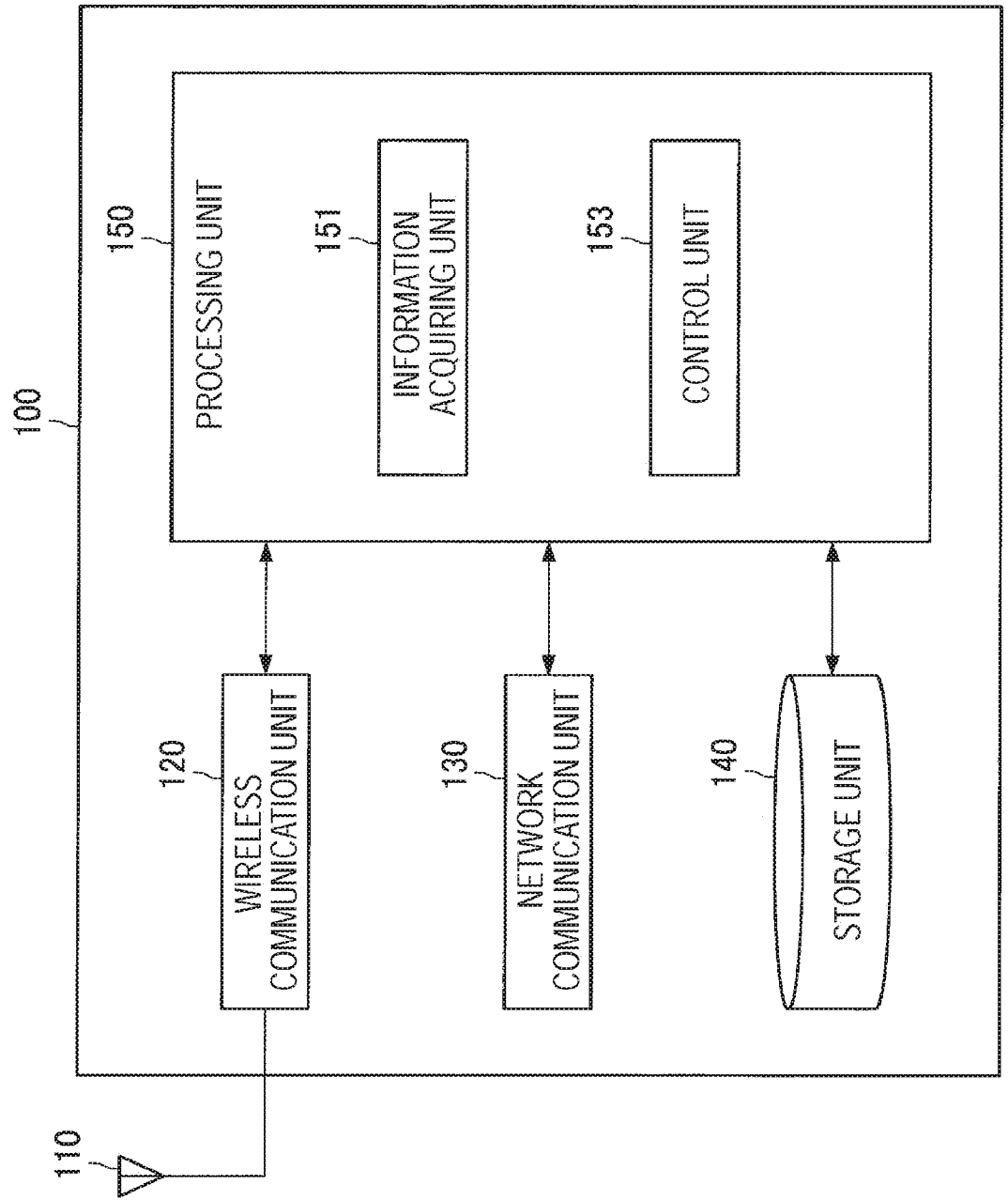
FIG. 4 is a block diagram showing an example of a configuration of a base station according to the embodiment.
Figure 5:
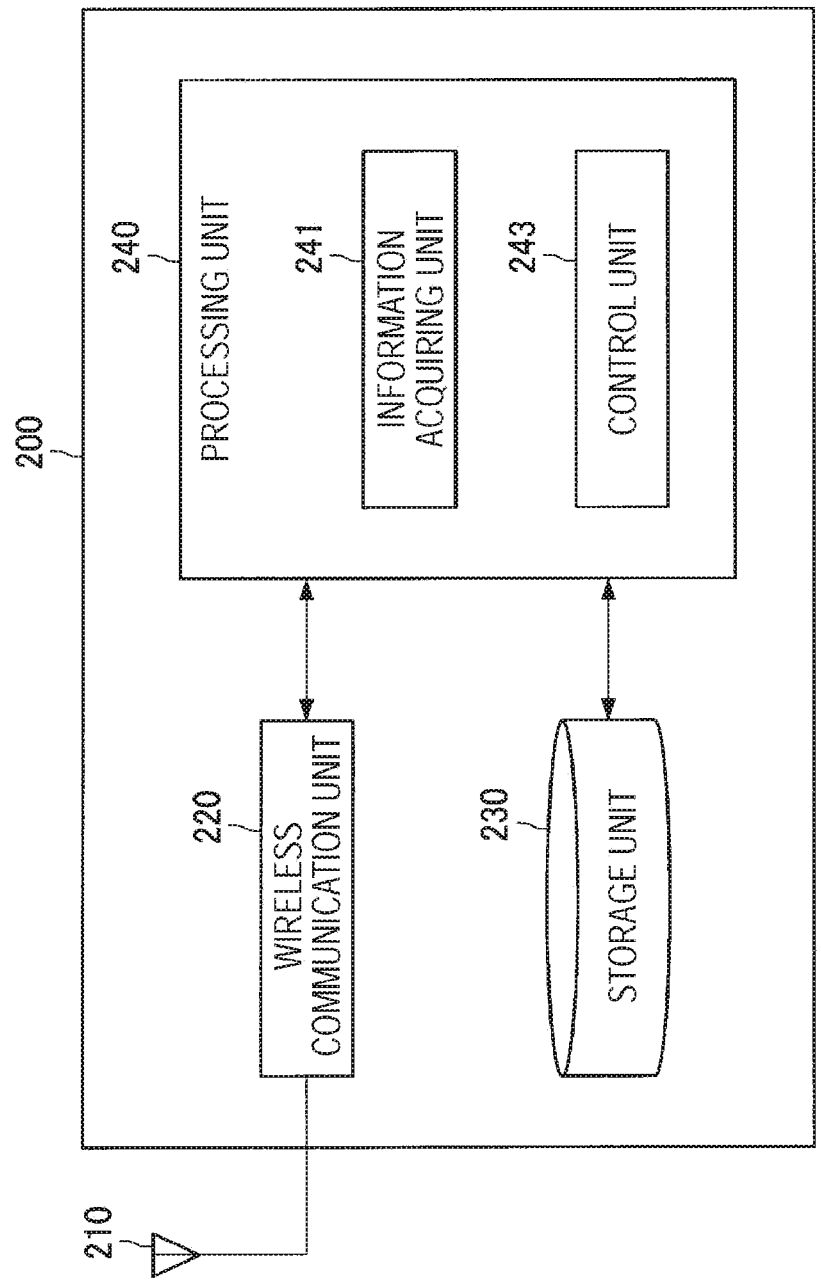
FIG. 5 is a block diagram showing an example of a configuration of a terminal apparatus according to the embodiment.

Next, examples of configurations of the base station 100 and the terminal apparatus 200 will be described with reference to FIGS. 4 and 5.

<3.1. Configuration of Base Station>

First of all, an example of the configuration of the base station 100 according to an embodiment of the present disclosure will be described with reference to FIG. 4. FIG. 4 is a block diagram showing an example of the configuration of the base station 100 according to the embodiment of the present disclosure. Referring to FIG. 4, the base station 100 includes an antenna unit 110, a wireless communication unit 120, a network communication unit 130, a storage unit 140, and a processing unit 150.

(1) Antenna Unit 110

The antenna unit 110 radiates a signal output by the wireless communication unit 120, in the form of radio waves, into space. The antenna unit 110 also converts radio waves in space into a signal, and outputs the signal to the wireless communication unit 120.

For example, the antenna unit 110 includes a directional antenna. For example, the directional antenna is a directional antenna which can be used in large-scale MIMO (for example, a directional antenna including a plurality of antenna elements).

(2) Wireless Communication Unit 120

The wireless communication unit 120 transmits and receives signals. For example, the wireless communication unit 120 transmits a downlink signal to the terminal apparatus 200 and receives an uplink signal from the terminal apparatus 200.

(3) Network Communication Unit 130

The network communication unit 130 transmits and receives information. For example, the network communication unit 130 transmits information to other nodes and receives information from other nodes. For example, the other nodes include other base stations and a core network node.

(4) Storage Unit 140

The storage unit 140 stores programs and data for operation of the base station 100.

(5) Processing Unit 150

The processing unit 150 provides various functions of the base station 100. The processing unit 150 includes an information acquiring unit 151 and a control unit 153. Note that the processing unit 150 may further include other components in addition to such components. That is, the processing unit 150 may perform operations other than operations of such components.

Specific operations of the information acquiring unit 151 and the control unit 153 will be described later in detail.

<3.2. Configuration of Terminal Apparatus>

Next, an example of the configuration of the terminal apparatus 200 according to an embodiment of the present disclosure will be described with reference to FIG. 5. FIG. 5 is a block diagram for showing an example of the configuration of the terminal apparatus 200 according to the embodiment of the present disclosure. Referring to FIG. 5, the terminal apparatus 200 includes an antenna unit 210, a wireless communication unit 220, a storage unit 230 and a processing unit 240.

(1) Antenna unit 210

The antenna unit 210 radiates a signal output by the wireless communication unit 220, in the form of radio waves, into space. The antenna unit 210 also converts radio waves in space into a signal, and outputs the signal to the wireless communication unit 220.

(2) Wireless communication unit 220

The wireless communication unit 220 transmits and receives signals. For example, the wireless communication unit 220 receives a downlink signal from the base station 100 and transmits an uplink signal to the base station 100.

(3) Storage unit 230

The storage unit 230 stores a program and data for operation of the terminal apparatus 200.

(4) Processing unit 240

The processing unit 240 provides various functions of the terminal apparatus 200. The processing unit 240 includes an information acquiring unit 241 and the control unit 243. Note that the processing unit 240 may further include other components in addition to such components. That is, the processing unit 240 may also perform operations other than operations of such components.

Specific operations of the information acquiring unit 241 and the control unit 243 will be described below in detail.

4. Technical Features

Next, technical features according to the embodiment of the present disclosure will be described with reference to FIGS. 6 to 12.

(1) Notification of the Subarray Information

The base station 100 (the information acquiring unit 151) obtains subarray information indicating a plurality of subarrays usable for multilayer MIMO. Then, the base station 100 (the control unit 153) notifies the terminal apparatus of the subarray information.

(a) Subarray

For example, each of the plurality of subarrays includes one or more antenna ports. Further, for example, each of the antenna ports is a virtual antenna corresponding to one or more physical antenna elements. Examples of the antenna port and the subarray will be described below with reference to FIGS. 6 to 8.

Figure 6:
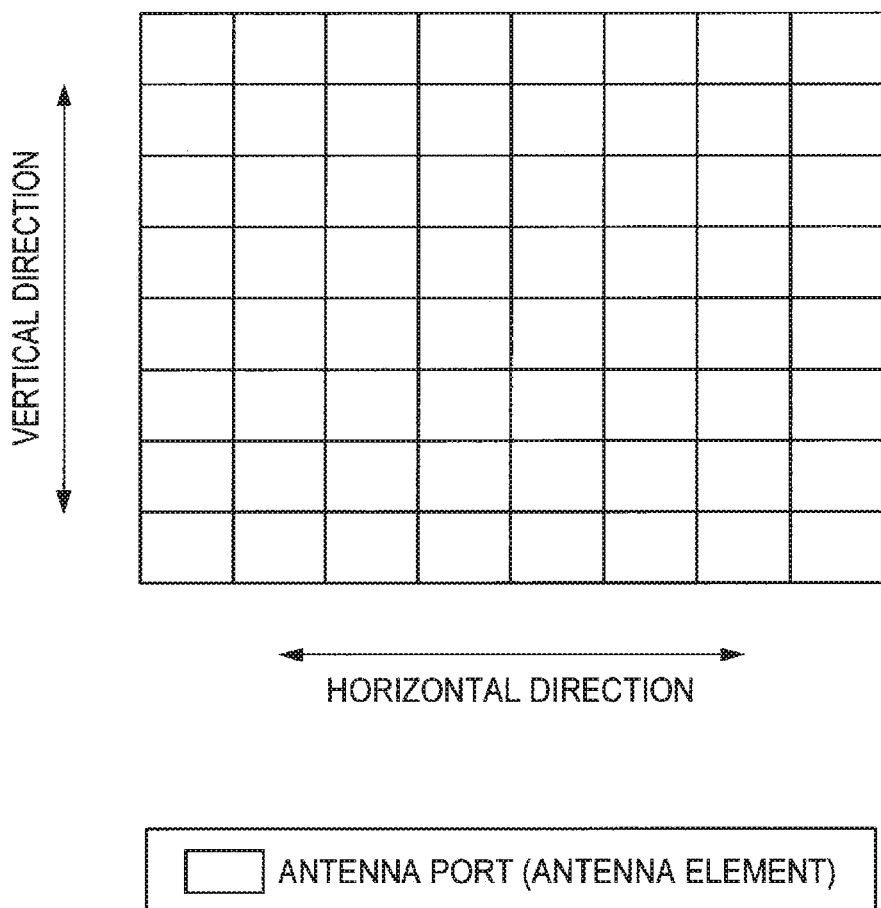
FIG. 6 is an explanatory diagram for describing an example of an antenna port.

FIG. 6 is an explanatory diagram for describing an example of the antenna port. Referring to FIG. 6, an 8×8 directional antenna, in which eight antenna elements are arranged in each of the horizontal direction and the vertical direction, is illustrated. In other words, the directional antenna including 64 antenna elements is illustrated. For example, the base station 100 includes the directional antenna. Particularly, in this example, the antenna port corresponds to one antenna element. Therefore, the base station 100 includes 64 antenna ports.

FIG. 7 is an explanatory diagram for describing a first example of the subarray. Referring to FIG. 7, an 8×8 directional antenna is illustrated like in FIG. 6. For example, subarrays 301 and 303 each including eight antenna ports (eight antenna elements) arranged in the vertical direction are prepared as subarrays. The plurality of subarrays may include the subarrays 301 and 303.

Figure 8:
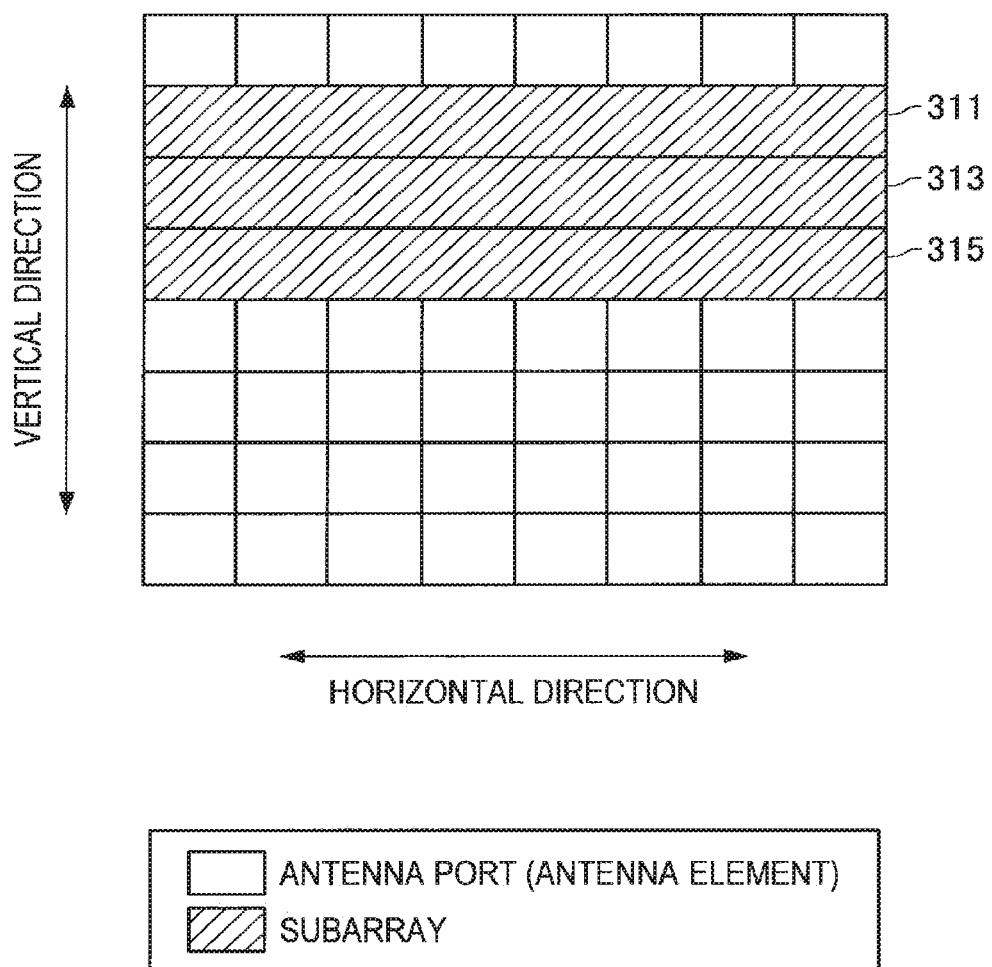
FIG. 8 is an explanatory diagram for describing a second example of a sub array.

FIG. 8 is an explanatory diagram for describing a second example of the subarray. Referring to FIG. 8, an 8×8 directional antenna is illustrated like in FIG. 6. For example, subarrays 311, 313, and 315 each including eight antenna ports (eight antenna elements) arranged in the horizontal direction are prepared as subarrays. The plurality of subarrays may include such subarrays 311, 313, and 315.

Note that the plurality of subarrays may include two or more subarrays which share one or more antenna ports. Accordingly, for example, it is possible to increase the degree of freedom of the subarray. An example of such a subarray will be described below with reference to FIGS. 9 and 10.

Figure 9:
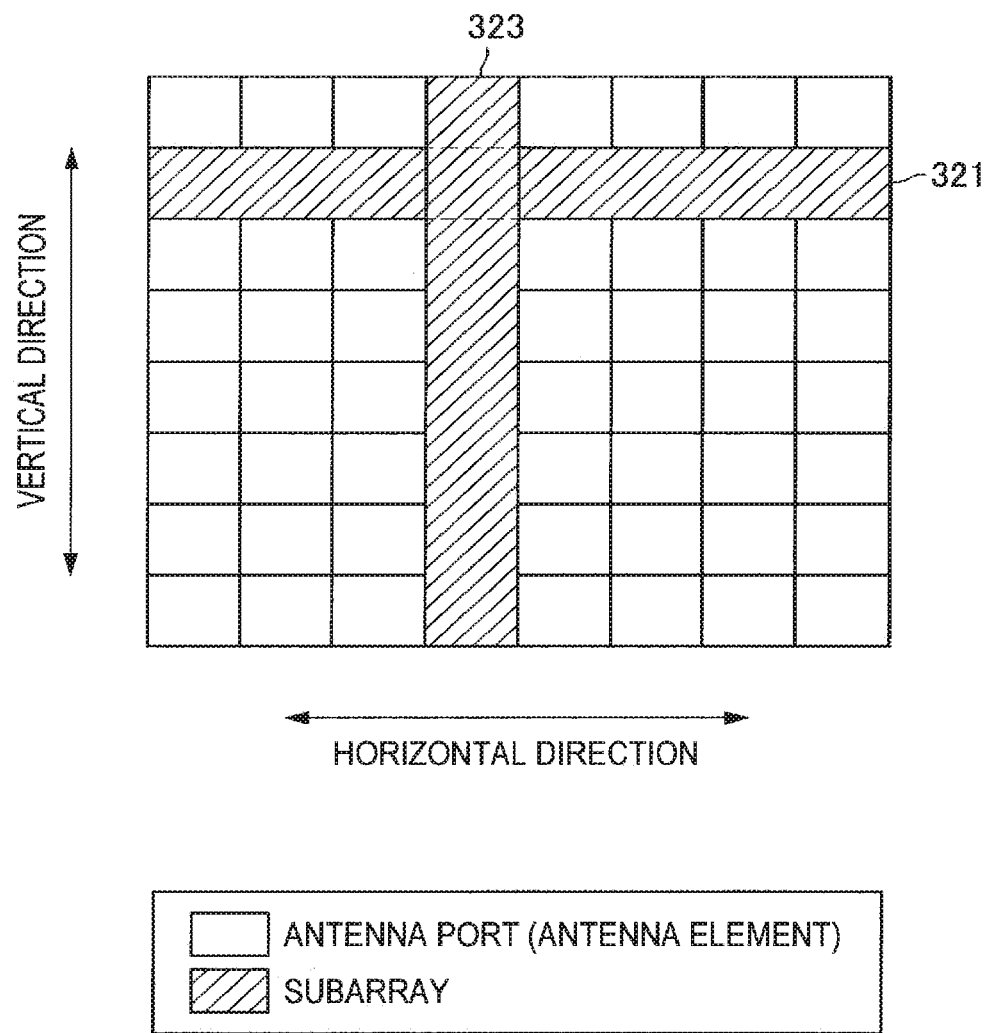
FIG. 9 is an explanatory diagram for describing a third example of a sub array.

FIG. 9 is an explanatory diagram for describing a third example of the subarray. Referring to FIG. 9, an 8×8 directional antenna is illustrated. For example, a subarray 321 including eight antenna ports (eight antenna elements) arranged in the horizontal direction and a subarray 323 including eight antenna ports (eight antenna elements) aligned in the vertical direction are prepared as subarrays. The subarray 321 and the subarray 323 share one antenna port (one antenna element). The plurality of subarrays may include the subarrays 321 and 323.

FIG. 10 is an explanatory diagram for describing a fourth example of the subarray. Referring to FIG. 10, an 8×8 directional antenna is illustrated. For example, 7×7 subarrays 331 and 333 in which seven antenna ports (antenna elements) are arranged in each of the horizontal direction and the vertical direction are prepared as subarrays. The subarray 331 and the subarray 333 share 36 antenna ports (36 antenna elements). The plurality of subarrays may include the subarrays 331 and 333.

(b) Content of Subarray Information

For example, the subarray information includes information indicating an antenna port included in each of the plurality of subarrays. More specifically, for example, the subarray information includes a port number of the antenna port included in each of the plurality of subarrays.

Further, the subarray information may include identification information identifying each of the plurality of subarrays. More specifically, the subarray information may include a subarray number of each of the plurality of subarrays.

(c) Notification Technique (c-1) Signaling

For example, the base station 100 (the control unit 153) notifies the terminal apparatus 200 of the subarray information through signaling (for example, radio resource control (RRC) signaling) destined for the terminal apparatus 200. More specifically, for example, the base station 100 (the control unit 153) notifies the terminal apparatus 200 of the subarray information through a signaling message (for example, an RRC message).

As a specific process, for example, the control unit 153 generates a signaling message including the subarray information. Then, the processing unit 150 (for example, the control unit 153) performs a process of transmitting the signaling message.

(c-2) System Information

Alternatively, the base station 100 (the control unit 153) notifies the terminal apparatus 200 of the subarray information through system information (for example, a system information block (SIB)).

As a specific process, for example, the control unit 153 generates system information including the subarray information. Then, the processing unit 150 (for example, the control unit 153) performs a process of transmitting the system information.

(2) Notification of Other Information (a) First Number Information

For example, the base station 100 (the information acquiring unit 151) acquires first number information indicating the number of subarrays to be combined for multilayer MIMO. Then, the base station 100 (the control unit 153) notifies the terminal apparatus 200 of the first number information.

For example, the base station 100 uses an array antenna system for multilayer MIMO, and the array antenna system is a combination of two or more subarrays. Therefore, the number (for example, M) of subarrays combined for multilayer MIMO is the number of subarrays included in the array antenna system used for multilayer MIMO. Further, the first number information is information indicating the number (for example, M) of subarrays included in the array antenna system.

Accordingly, for example, the terminal apparatus 200 can select a combination of subarrays that can be used for multilayer MIMO.

(b) Second Number Information

As will be described later, the terminal apparatus 200 reports on a combination of two or more subarrays included in the plurality of subarrays. For example, the base station 100 (the information acquiring unit 151) acquires second number information indicating the number of combinations of subarrays to be reported. Then, the base station 100 (the control unit 153) notifies the terminal apparatus 200 of the second number information. For example, the number of combinations is smaller than the number of all combinations of the subarrays.

Accordingly, for example, radio resources necessary for the reporting by the terminal apparatus 200 are suppressed.

(c) Third Number Information

For example, the base station 100 (the information acquiring unit 151) acquires third number information indicating the number of subarrays included in the plurality of subarrays. Then, the base station 100 (the control unit 153) notifies the terminal apparatus 200 of the third number information.

(d) Notification Technique

For example, the base station 100 (the control unit 153) notifies the terminal apparatus 200 of the first number information, the second number information, and/or the third number information, similarly to the subarray information. More specifically, for example, the base station 100 (the control unit 153) notifies the terminal apparatus 200 of the first number information, the second number information, and/or the third number information through signaling or system information destined for the terminal apparatus 200.

Figure 11:
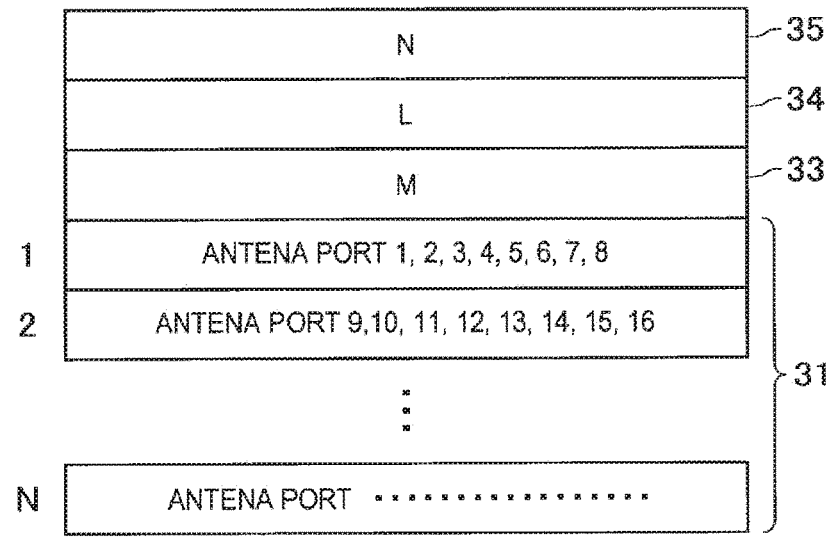
FIG. 11 is an explanatory diagram for describing an example of information which a terminal apparatus is notified of by a base station in the embodiment.

(3) Specific Example of Information which Terminal Apparatus is Notified of by Base Station FIG. 11 is an explanatory diagram for describing an example of information which the terminal apparatus 200 is notified of by the base station 100 in the embodiment of the present disclosure. Referring to FIG. 11, a subarray configuration 30 which is information which the terminal apparatus 200 is notified of by the base station 100 is illustrated. In this example, the subarray configuration 30 includes subarray information 31, first number information 33, second number information 34, and third number information 35. The subarray information 31 indicates an antenna port included in each of N subarrays (subarrays 1 to N) usable for multilayer MIMO. For example, the subarray 1 includes antenna ports 1 to 8, and the subarray 2 includes antenna ports 9 to 16. The first number information 33 indicates the number M of subarrays to be combined for multilayer MIMO (that is, the number M of subarrays included in the array antenna system). The second number information 34 indicates the number L of combinations of subarrays to be reported. The third number information 35 indicates the total number N of subarrays.

(4) Report Related to Combination of Subarray Candidates

The terminal apparatus 200 (the information acquiring unit 241) acquires the subarray information. The terminal apparatus 200 (the control unit 243) performs a report related to a combination of two or more subarrays included in the plurality of subarrays.

(a) Report Example (a-1) Report of Combination of Subarrays

For example, the terminal apparatus 200 (the control unit 243) selects a combinations of two or more subarrays desirable for multilayer MIMO from among the plurality of subarrays, and the report includes a report of the combination of the two or more subarrays desirable for multilayer MIMO. In other words, the combination is an array antenna system desirable for multilayer MIMO.

Selection of combination of subarrays

For example, the terminal apparatus 200 (the control unit 243) performs channel estimation on the basis of the reference signal (for example, the CSI-RS) transmitted from the base station 100. Specifically, for example, the base station 100 includes 64 antenna ports, and the terminal apparatus 200 includes 8 antennas. In this case, the base station 100 transmits a reference signal for each antenna port, and the terminal apparatus 200 calculates a 64×8 channel matrix.

Further, for example, the terminal apparatus 200 (the control unit 243) decides the PMI, the RI, CQI, or the like for each combination of subarrays on the basis of a result of the channel estimation (that is, the channel matrix). Then, for example, the terminal apparatus 200 (the control unit 243) selects a combination of subarrays desirable for multilayer MIMO on the basis of the PMI, the RI, and/or the CQI for each of the combinations of subarrays. As an example, the terminal apparatus 200 (the control unit 243) selects a combination of subarrays associated with a larger RI as the combination of subarrays desirable for multilayer MIMO.

Report of combination of subarrays

For example, the terminal apparatus 200 (the control unit 243) reports combination information indicating the combination of the two or more subarrays (that is, an array antenna system) to the base station 100.

Accordingly, for example, the base station 100 can detect the combination of subarrays desirable for the terminal apparatus 200.

(a-2) Report of Weight Set

For example, the report includes a report of a weight set for the combination of the two or more subarrays. For example, the weight set includes a weight set for adjusting a phase between the two or more subarrays.

Decision of weight set

For example, the base station 100 decides a PMI (that is, an indicator indicating a precoding matrix serving as the weight set) for each combination of subarrays on the basis of the result of the channel estimation (that is, the channel matrix). More specifically, for example, the base station 100 decides a PMI of a weight set for obtaining directivity and/or a PMI of the weight set for adjusting the phase between subarrays for each combination of subarrays.

The base station 100 decides one or both of a PMI of a weight set for obtaining directivity in the horizontal direction and a PMI of a weight set for obtaining directivity in the vertical direction as the PMI of the weight set for obtaining the directivity. Alternatively, the base station 100 may decide a PMI of a weight set for obtaining directivity in both the horizontal direction and the vertical direction as the weight set PMI for obtaining the directivity.

Report of weight set

For example, the terminal apparatus 200 (the control unit 243) reports weight information indicating the weight set for the combination of the two or more subarrays to the base station 100. For example, the weight information is the PMI. More specifically, for example, the weight information is the PMI of the weight set for obtaining the directivity and/or the PMI of the weight set for adjusting the phase between subarrays.

Accordingly, for example, the base station 100 can detect a weight set to be applied to the combination of the subarrays.

(a-3) Report of Number of Layers

For example, the report includes a report of the number of layers for the combination of the two or more subarrays.

Decision of number of layers

For example, the base station 100 decides an RI (that is, an indicator indicating the number of layers) for each combination of subarrays on the basis of the result of the channel estimation (that is, the channel matrix).

Report of number of layers

For example, the terminal apparatus 200 (the control unit 243) reports layer number information indicating the number of layers for the two or more subarrays to the base station 100. For example, the layer number information is the RI.

Accordingly, for example, the base station 100 can detect the number of layers applicable to combinations of subarrays.

(a-4) Report of Channel State

For example, the report includes a report of a channel quality on the combination of the two or more subarrays.

Decision of channel quality

For example, the base station 100 decides a CQI (that is, an indicator indicating a channel quality) for each combination of subarrays on the basis of the result of the channel estimation (that is, the channel matrix).

Report of channel quality

For example, the terminal apparatus 200 (the control unit 243) reports channel quality information indicating the channel quality for the two or more subarrays to the base station 100. For example, the channel quality information is the CQI.

Accordingly, for example, the base station 100 can detect the channel quality for the combination of subarrays.

(b) Specific Example of Report Information

Figure 12:
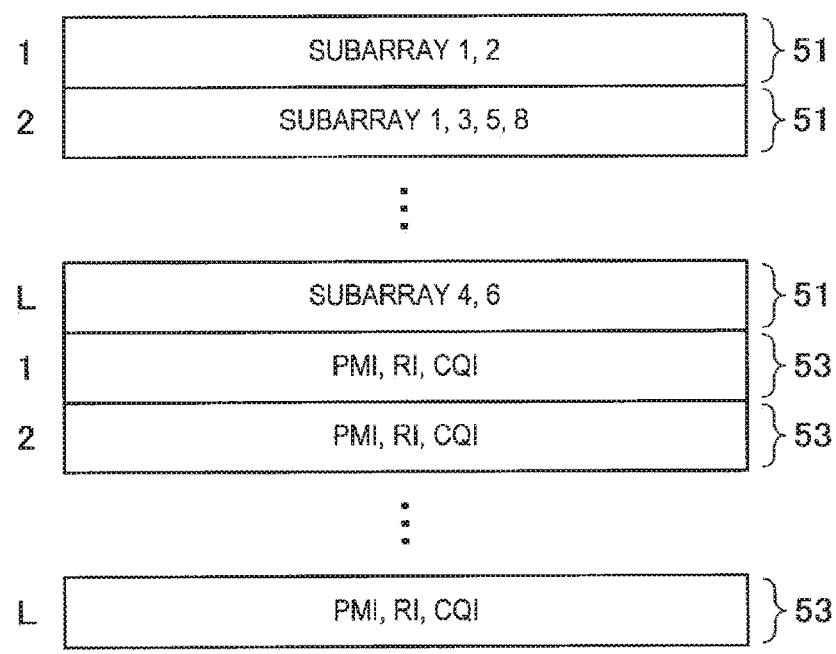
FIG. 12 is an explanatory diagram for describing an example of report information reported from a terminal apparatus to a base station in the embodiment.

FIG. 12 is an explanatory diagram for describing an example of report information reported from the terminal apparatus 200 to the base station 100 in the embodiment of the present disclosure. Referring to FIG. 12, report information 50, which is reported from the terminal apparatus 200 to the base station 100, is illustrated. In this example, the report information 50 includes combination information 51 indicating a combination of subarrays (that is, the array antenna system) desirable for multilayer MIMO. More specifically, the report information 50 includes the combination information 51 of each of L array antenna systems (that is, L combinations). For example, a first array antenna system includes the subarrays 1 and 2, a second array antenna system includes subarrays 1, 3, 5, and 8, and an L-th array antenna system includes subarrays 4 and 6. Further, the report information 50 includes channel state information 53 including the weight information (PMI), the layer number information (RI), and the channel quality information (CQI) for the combination of subarrays (that is, the array antenna system). Specifically, the report information 50 includes the channel state information 53 of each of the L array antenna systems (that is, the L combinations).

Further, the terminal apparatus 200 may report the report information to the base station 100 for each array antenna system (that is, a combination of subarrays).

(c) Specific Process

As a specific process, for example, the control unit 243 generates the report information. Then, the processing unit 240 (for example, the control unit 243) performs the process of transmitting the report information.

(5) Decision of Combination of Subarray Candidates

For example, the base station 100 (the control unit 153) decides a combination of two or more subarrays to be used for multilayer MIMO for the terminal apparatus 200 on the basis of the report performed by the terminal apparatus 200. In other words, the base station 100 (the control unit 153) decides the array antenna system used for multilayer MIMO for the terminal apparatus 200.

More specifically, for example, the base station 100 (the control unit 153) decides the array antenna system (that is, the combination of the two or more subarrays) on the basis of the report information reported by the terminal apparatus 200. As an example, the base station 100 (the control unit 153) decides an array antenna system (that is, an array antenna system associated with a larger RI) that enables transmission in more layers.

Further, for example, the array antenna system (that is, the combination of the two or more subarrays) does not include more than a predetermined number of subarrays that share one or more antenna ports. Accordingly, for example, it is possible to prevent an allocation of electric power exceeding a maximum transmission power of a power amplifier (PA) of an antenna element.

(6) Transmission and reception of multilayer MIMO

The base station 100 transmits a signal to the terminal apparatus 200 in two or more layers using the decided combination of the subarrays (that is, the decided array antenna system). Further, the terminal apparatus 200 receives a signal from the base station 100 in the two or more layers.

The technical features related to the embodiment of the present disclosure have been described above. According to the embodiment of the present disclosure, the base station 100 notifies the terminal apparatus 200 of the subarray information indicating the plurality of subarrays, and the terminal apparatus 200 performs the report related to the combination of two or more subarrays included in the plurality of subarrays (that is, the antenna array system). Accordingly, for example, it is possible to use a combination of subarrays desirable for multilayer MIMO.

5. Process Flow

Figure 13:
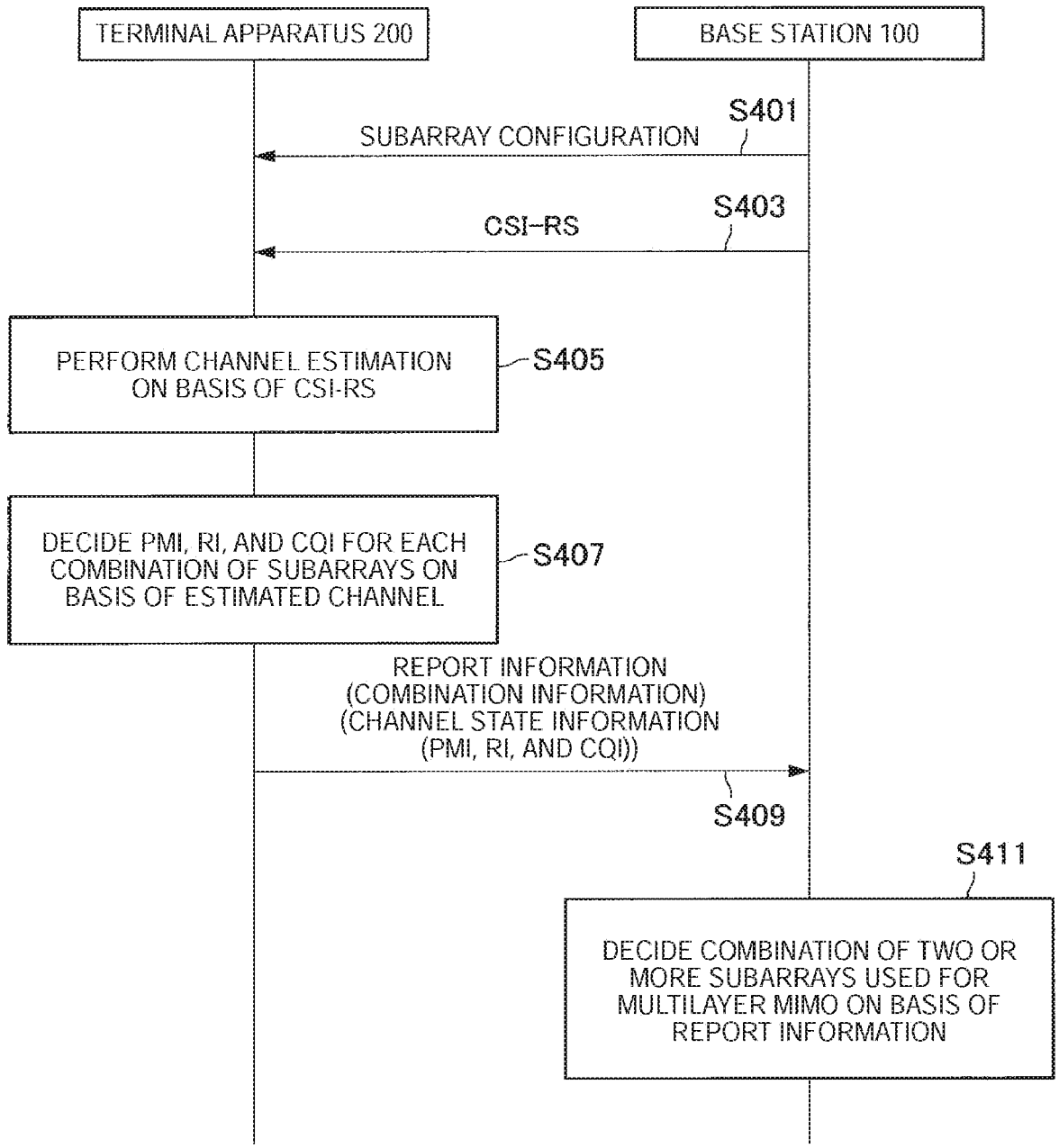
FIG. 13 is a sequence diagram illustrating an example of a schematic flow of a process according to the embodiment.

Next, an example of a process according to the embodiment of the present disclosure will be described with reference to FIG. 13. FIG. 13 is a sequence diagram illustrating an example of a schematic flow of a process according to the embodiment of the present disclosure.

The base station 100 notifies the terminal apparatus 200 of a subarray configuration (S401). For example, the subarray configuration includes subarray information, first number information, second number information, and third number information. The subarray information is information indicating a plurality of subarrays usable for multilayer MIMO. The first number information indicates the number (for example, M) of subarrays to be combined for multilayer MIMO. The second number information indicates the number of combinations (for example, L) of subarray to be reported. The third number information indicates the number (for example, N) of subarrays included in the plurality of subarrays.

The base station 100 transmits a CSI-RS (S403).

The terminal apparatus 200 performs channel estimation on the basis of the CSI-RS transmitted from the base station 100 (S405). In other words, the terminal apparatus 200 calculates a channel matrix. Then, the terminal apparatus 200 decides a PMI, an RI, and a CQI for each combination of subarrays (that is, for each array antenna system) on the basis of the estimated channel (that is, the calculated channel matrix) (S 407).

The terminal apparatus 200 (the control unit 243) performs a report related to a combination of two or more subarrays included in the plurality of subarrays (S409). Specifically, for example, the terminal apparatus 200 (the control unit 243) reports report information to the base station 100. For example, the report information includes combination information and channel state information. The combination information indicates a combination of subarrays (that is, an antenna array system) desirable for multilayer MIMO. The channel state information includes weight information (the PMI), layer number information (the RI), and/or channel quality information (the CQI) for the combination of the subarrays.

The base station 100 decides a combination of the two or more subarrays used for multilayer MIMO for the terminal apparatus 200 on the basis of the report information (S411).

6. Modified Examples

Next, first to third modified examples according to the embodiment of the present disclosure will be described with reference to FIGS. 14 to 21.

6.1. First Modified Example

First, the first modified example according to the embodiment of the present disclosure will be described with reference to FIGS. 14 to 16.

(1) Notification of Combination Candidate Information

According to the first modified example, the base station 100 (the information acquiring unit 151) acquires combination candidate information indicating one or more combination candidates of two or more subarrays (that is, one or more array antenna system candidates) included in the plurality of subarrays. Then, the base station 100 (the control unit 153) notifies the terminal apparatus 200 of the combination candidate information.

(a) Combination Candidate of Subarrays

As an example, each of the one or more combination candidates may be a combination of subarrays including only antenna ports arranged in the horizontal direction. As another example, each of the one or more combination candidates may be a combination of subarrays including only antenna ports arranged in the vertical direction. As yet another example, each of the one or more combination candidates may be a combination of subarrays including antenna ports extending in both the horizontal direction and the vertical direction.

(b) Content of Subarray Information

For example, the combination candidate information includes information indicating subarrays included in each of the one or more combination candidates (that is, the one or more array antenna system candidates). More specifically, for example, the combination candidate information includes a subarray number of a subarray included in each of the one or more combination candidates.

Further, the combination candidate information may include identification information identifying each of the one or more combination candidates (that is, the one or more array antenna system candidates). More specifically, the subarray information may include a combination candidate number of each of the one or more combination candidates (or an array antenna system number of each of the one or more array antenna system candidates).

(c) Notification Technique

For example, the base station 100 (the control unit 153) notifies the terminal apparatus 200 of the combination candidate information, similarly to the subarray information. More specifically, for example, the base station 100 (the control unit 153) notifies the terminal apparatus 200 of the combination candidate information through signaling or system information destined for the terminal apparatus 200.

Figure 14:
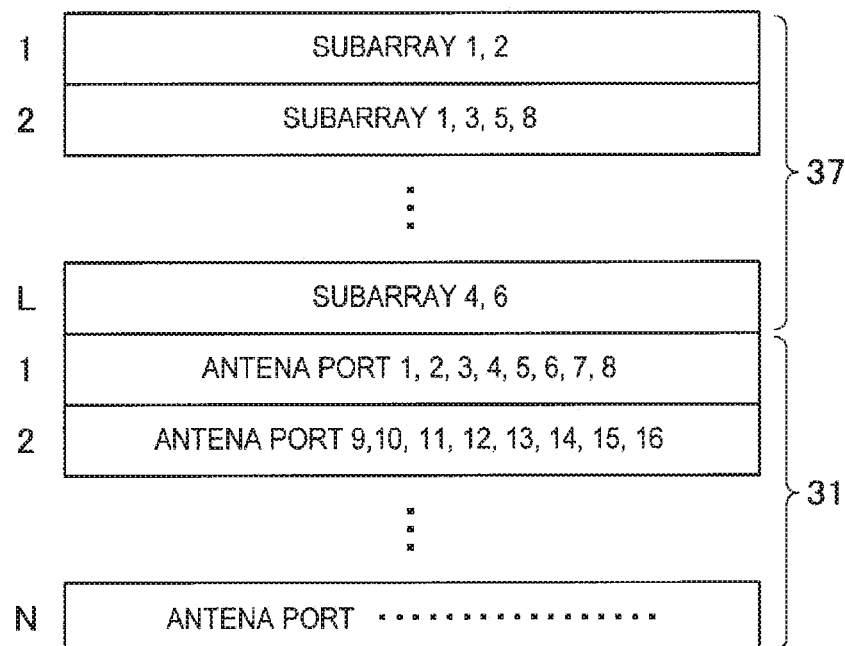
FIG. 14 is an explanatory diagram for describing an example of information which a terminal apparatus is notified of by a base station in a first modified example of the embodiment.

(2) Specific Example of Information which Terminal Apparatus is Notified of by Base Station Notifies FIG. 14 is an explanatory diagram for describing an example of information which the terminal apparatus 200 is notified of by the base station 100 in the first modified example of the embodiment of the present disclosure. Referring to FIG. 14, the subarray configuration 30, which is information which the terminal apparatus 200 is notified of by the base station 100, is illustrated. In this example, the subarray configuration 30 includes the subarray information 31 and the combination candidate information 37. Similarly to the example of FIG. 11, the subarray information 31 indicates antenna ports included in each of N subarrays (subarrays 1 to N) usable for multilayer MIMO. Particularly, the combination candidate information 37 indicates L combination candidates of subarrays included in the N subarrays. A combination candidate 1 includes subarrays 1 and 2, a combination candidate 2 includes subarrays 1, 3, 5, and 8, and a combination candidate L includes subarrays 4 and 6.

(3) Report Related to Combination of Subarray Candidates

As described above, the terminal apparatus 200 (the control unit 243) performs a report related to a combination of two or more subarrays included in the plurality of subarrays.

Particularly, in the first modified example, the terminal apparatus 200 (the information acquiring unit 241) acquires the combination candidate information. The report is the report related to the combination included in the one or more combination candidates. For example, the report is a report of channel state information of each of the one or more combination candidates. Alternatively, the terminal apparatus 200 (the control unit 243) may select a combination of subarrays desirable for multilayer MIMO from among the one or more combination candidates, and the report may be a report of a desired combination of subarrays. An example of the report information reported from the terminal apparatus 200 to the base station 100 will be described below with reference to FIG. 15.

Figure 15:
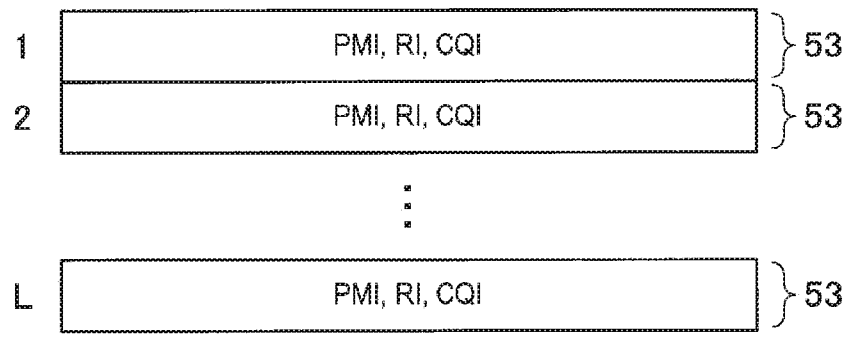
FIG. 15 is an explanatory diagram for describing an example of report information reported from a terminal apparatus to a base station in the first modified example of the embodiment.

FIG. 15 is an explanatory diagram for describing an example of the report information reported from the terminal apparatus 200 to the base station 100 in the first modified example of the embodiment of the present disclosure. Referring to FIG. 15, the report information 50 reported from the terminal apparatus 200 to the base station 100 is illustrated. In this example, the report information 50 includes the channel state information 53 for the L combination candidates of the subarrays indicated by the combination candidate information 37 which the terminal apparatus 200 is notified of by the base station 100 (as illustrated in FIG. 14). The channel state information 53 includes the weight information (PMI), the layer number information (RI), and the channel quality information (CQI).

(4) Priority Information

The combination candidate information may indicate two or more combination candidates of two or more subarrays included in the plurality of subarrays. The base station 100 (the information acquiring unit 151) may acquire priority information indicating a priority of the two or more combination candidates. Then, the base station 100 (the control unit 153) may notify the terminal apparatus of the priority information.

On the other hand, the terminal apparatus 200 (the information acquiring unit 241) may acquire the priority information. Then, the terminal apparatus 200 (the control unit 243) may perform the report related to the combination included in the two or more combination candidates on the basis of the priority information.

Figure 16:
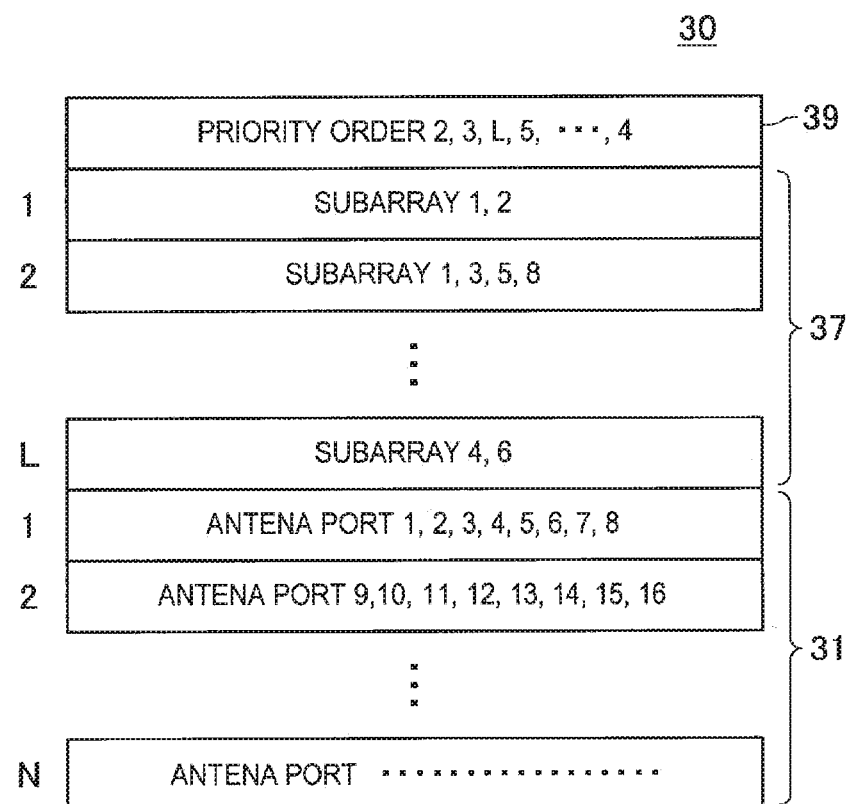
FIG. 16 is an explanatory diagram for describing another example of information which a terminal apparatus is notified of by a base station in the first modified example of the embodiment.

FIG. 16 is an explanatory diagram for describing another example of information which the terminal apparatus 200 is notified of by the base station 100 in the first modified example of the embodiment of the present disclosure. Referring to FIG. 16, the subarray configuration 30, which is information which the terminal apparatus 200 is notified of by the base station 100, is illustrated. In this example, the subarray configuration 30 includes the subarray information 31, the combination candidate information 37, and priority information 39. Particularly, the priority information 39 indicates priorities of L combination candidates. For example, a priority of the combination candidate 2 is the first, and a priority of the combination candidate 4 is the last.

As described above, according to the first modified example, the base station 100 (the control unit 153) notifies the terminal apparatus 200 of the combination candidate information indicating the one or more combination candidates. Then, the terminal apparatus 200 (the control unit 243) performs the report related to the combination included in the one or more combination candidates. Accordingly, for example, a load on the terminal apparatus 200 is reduced. More specifically, for example, since the terminal apparatus 200 only has to decide a PMI, an RI, and/or a CQI for a limited combination rather than all combinations of subarrays (NCM combinations), the load on the terminal apparatus 200 is reduced. N is the total number of subarrays, and M is the number of subarrays included in the antenna array system.

6.2. Second Modified Example

Next, the second modified example according to the embodiment of the present disclosure will be described with reference to FIGS. 17 to 19.

(1) Notification of Group Information

According to the second modified example, the base station 100 (the information acquiring unit 151) acquires group information indicating a group of two or more subarrays forming a directional beam in the same radiation direction in multilayer MIMO among the plurality of subarrays. Then, the base station 100 (the control unit 153) notifies the terminal apparatus 200 of the group information.

(a) Group of Subarrays

According to the second modified example, the two or more subarrays that form the directional beam in the same radiation direction in multilayer MIMO belong to the same group. In other words, two or more subarrays to which the same weight set is applied in multilayer MIMO belong to the same group. An example of a group of subarrays will be described below with reference to FIGS. 17 to 22.

(a-1) First Example

Figure 17:
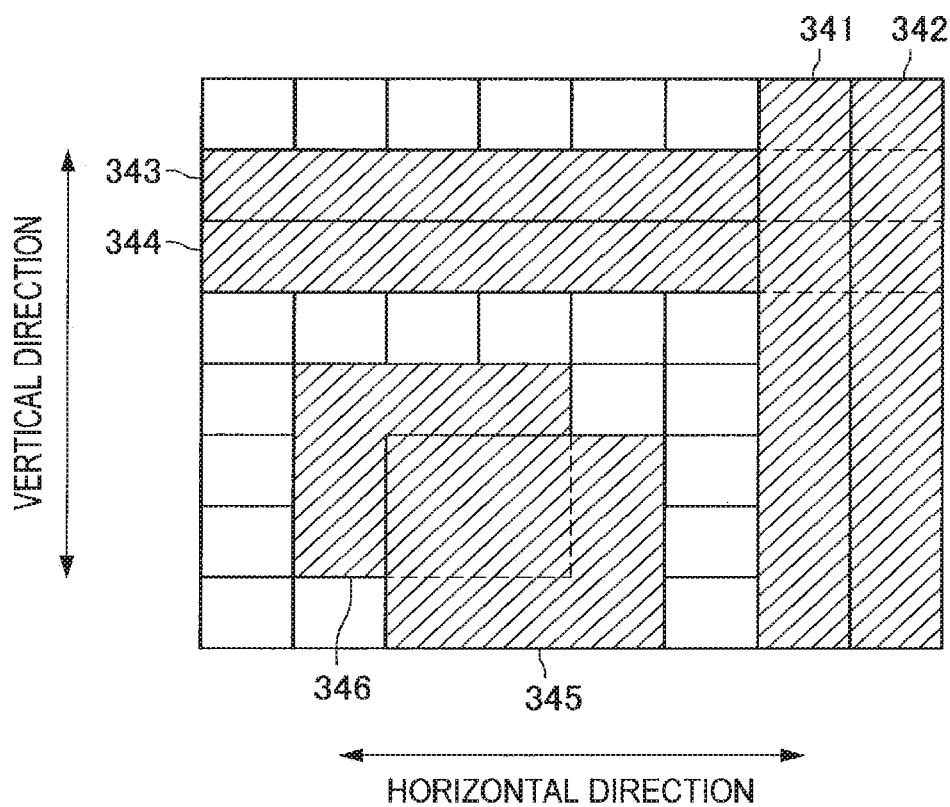
FIG. 17 is a first explanatory diagram for describing a first example of a group of subarrays.

FIGS. 17 and 18 are explanatory diagrams for describing a first example of a group of subarrays.

Referring to FIG. 17, an 8×8 directional antenna is illustrated. For example, subarrays 341 and 342, each including eight antenna ports arranged in the vertical direction, subarrays 343 and 344, each including eight antenna ports arranged in the horizontal direction, and 3×3 subarrays 345 and 346, each including three antennas arranged in each of the horizontal direction and the vertical direction, are prepared as subarrays. In this example, the subarrays 341 and 342 belong to one group, the subarrays 343 and 344 belong to another group, and the subarrays 345 and 346 belong to another group.

Referring to FIG. 18, subarray numbers and group numbers are illustrated. Subarray numbers of the subarrays 341 to 346 are 1 to 6, respectively. The subarrays 341 and 342 whose subarray numbers are 1 and 2 belong to a group whose group number is 1. The subarrays 343 and 344 whose subarray numbers are 3 and 4 belong to a group whose group number is 2. The subarrays 345 and 346 whose subarray numbers are 5 and 6 belong to a group whose group number is 3.

(a-2) Second Example

Figure 20:
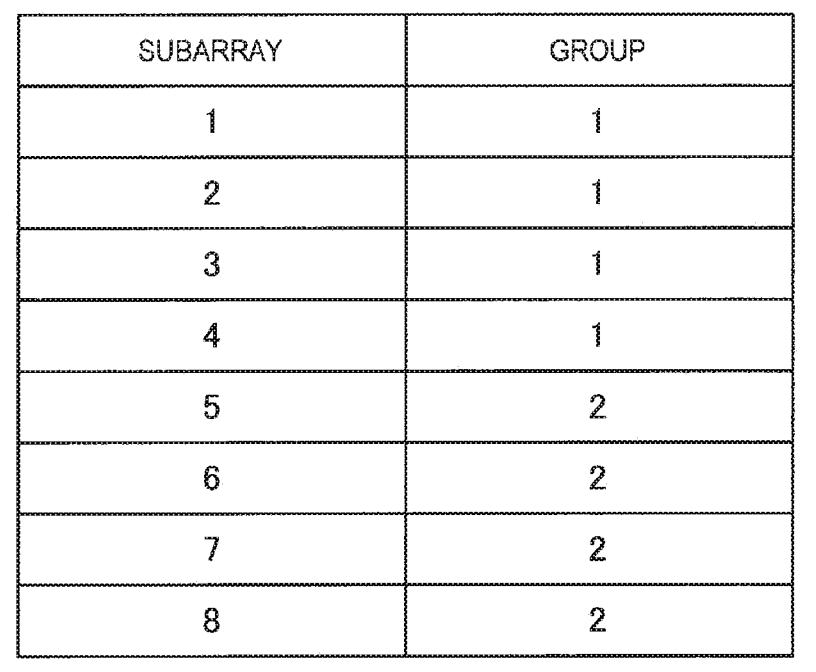

FIGS. 19 and 20 are explanatory diagrams for describing a second example of a group of subarrays.

Referring to FIG. 19, an 8×8 directional antenna is illustrated. For example, subarrays 351, 352, 353, and 354, each including eight antenna ports arranged in the vertical direction, and 3×3 subarrays 355, 356, 357, and 358, each including three antenna ports arranged in each of the horizontal direction and the vertical direction, are prepared as subarrays. In this example, the subarrays 351, 352, 353, and 354 belong to one group, and the subarrays 355, 356, 357, and 358 belong to another group.

Referring to FIG. 20, subarray numbers and group numbers are illustrated. Subarray numbers of the subarrays 351 to 358 are 1 to 8, respectively. The subarrays 351 to 354 whose subarray numbers are 1 to 4 belong to a group whose group number is 1. The subarrays 355 to 358 whose subarray numbers are 5 to 8 belong to a group whose group number is 2.

(a-3) Third Example

Figure 21:
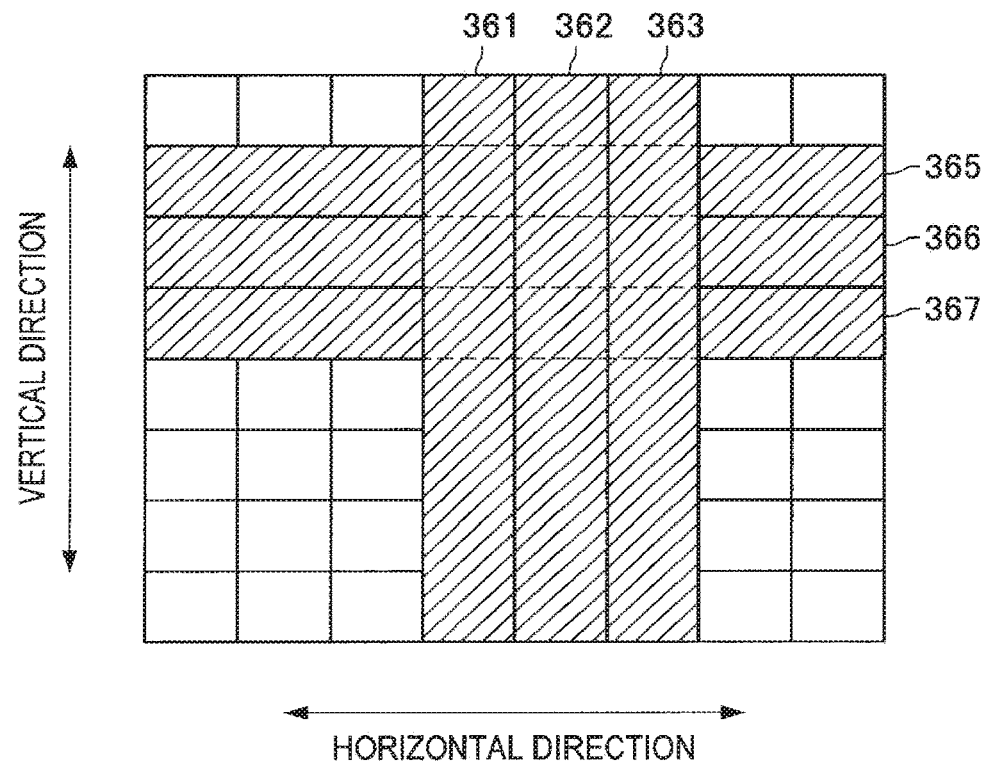
FIG. 21 is a first explanatory diagram for describing a third example of a group of subarrays.
Figure 22:
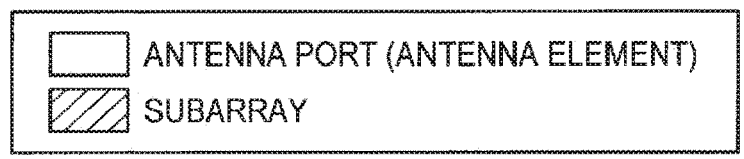
FIG. 22 is a second explanatory diagram for describing a third example of a group of subarrays.

FIGS. 21 and 22 are explanatory diagrams for describing a third example of a group of subarrays.

FIG. 21 is an explanatory diagram for describing a first example of a group of subarrays. Referring to FIG. 21, an 8×8 directional antenna is illustrated. For example, subarrays 361, 362, and 363, each including eight antenna ports (eight antenna elements) arranged in the vertical direction, and subarrays 365, 366, and 367, each including eight antenna ports (eight antenna elements) arranged in the horizontal direction, are prepared as subarrays. In this example, the subarrays 361, 362, and 363 belong to one group, and the subarrays 365, 366, and 367 belong to another group.

Referring to FIG. 22, subarray numbers and group numbers are illustrated. Subarray numbers of the subarrays 361 to 367 are 1 to 6, respectively. The subarrays 361 to 363 whose subarray numbers are 1 to 3 belong to a group whose group number is 1. The subarrays 365 to 367 whose subarray numbers are 4 to 6 belong to a group whose group number is 2.

(b) Content of Group Information

For example, group information is information indicating a group to which each of the plurality of subarrays belongs. More specifically, for example, the group information includes the group number of the group to which each of the plurality of subarrays belongs. In other words, for example, the group information indicates information as illustrated in FIGS. 18, 20, and 22.

(c) Notification Technique

For example, the base station 100 (the control unit 153) notifies the terminal apparatus 200 of the group information, similarly to the subarray information. More specifically, for example, the base station 100 (the control unit 153) notifies the terminal apparatus 200 of the group information through signaling or system information destined for the terminal apparatus 200.

Figure 23:
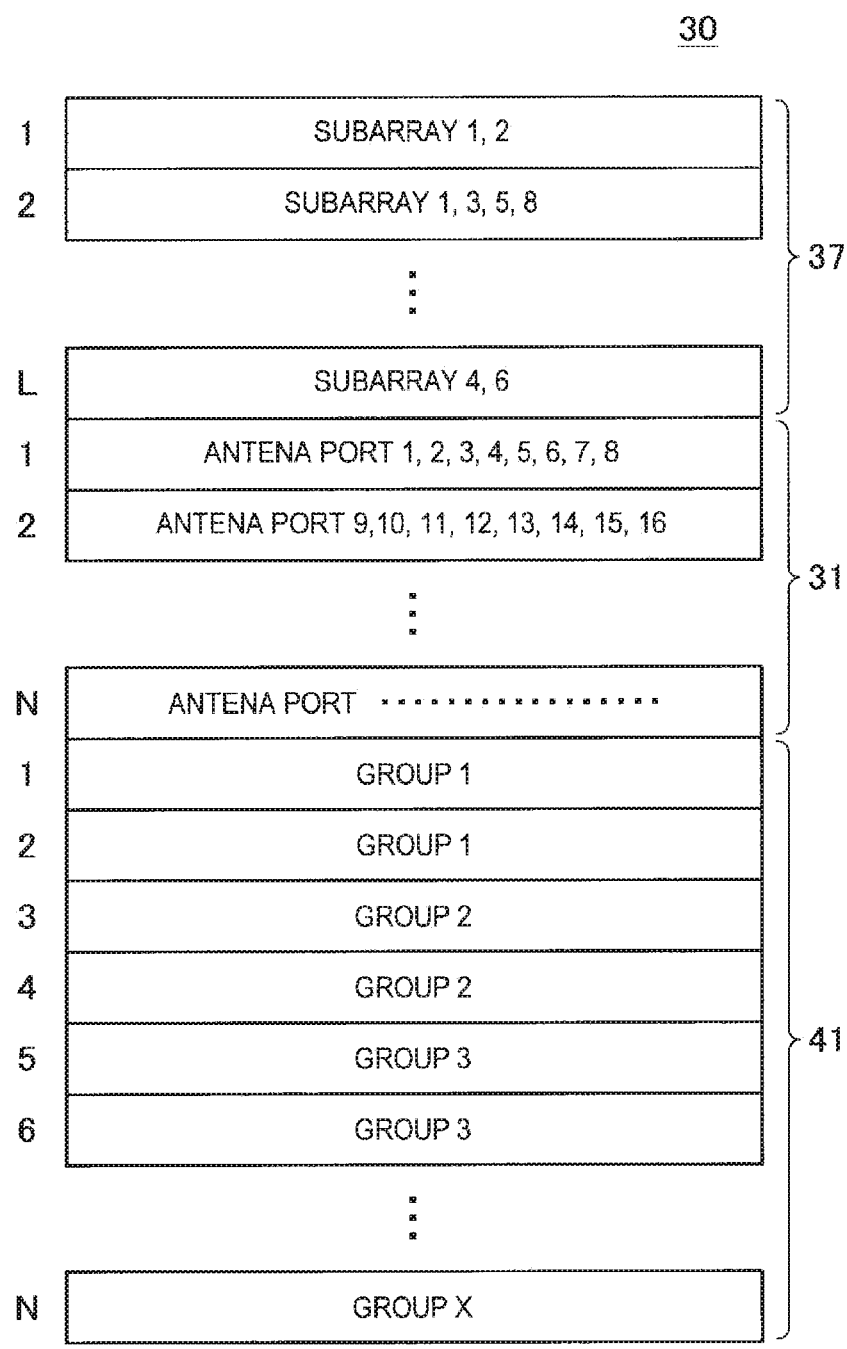
FIG. 23 is an explanatory diagram for describing an example of information which a terminal apparatus is notified of by a base station in a second modified example of the embodiment.

(3) Specific Example of Information which Terminal Apparatus is Notified of by Base Station FIG. 23 is an explanatory diagram for describing an example of information which the terminal apparatus 200 is notified of by the base station 100 in the second modified example of the embodiment of the present disclosure. Referring to FIG. 23, the subarray configuration 30, which is information which the terminal apparatus 200 is notified of by the base station 100, is illustrated. In this example, the subarray configuration 30 includes the subarray information 31, the combination candidate information 37, and group information 41. Similarly to the example of FIG. 14, the subarray information 31 indicates an antenna port included in each of N subarrays (subarrays 1 to N) usable for multilayer MIMO. Further, the combination candidate information 37 indicates L combination candidates of subarrays included in the N subarray. Particularly, the group information 41 indicates a group to which each of the N subarrays (the subarrays 1 to N) belongs. For example, the subarrays 1 and 2 belong to a group 1, the subarrays 3 and 4 belong to a group 2, and the subarrays 5 and 6 belong to a group 3.

(4) Decision of Weight Set

In the second modified example, the terminal apparatus 200 (the information acquiring unit 241) acquires the group information. Then, the terminal apparatus 200 (the control unit 243) decides a weight set for obtaining directivity for the group on the basis of the group information. In other words, the terminal apparatus 200 (the control unit 243) decides the weight set (PMI) for obtaining the directivity in units of groups.

Here, the weight set for obtaining the directivity may be a weight set for obtaining directivity in the horizontal direction, a weight set for obtaining directivity in the vertical direction, and a pair of the weight sets. Alternatively, the weight set for obtaining the directivity may be a weight set for obtaining directivity in both the horizontal direction and the vertical direction.

As an example, referring back to FIG. 17, the terminal apparatus 200 (the control unit 243) decides the weight set (PMI) for obtaining the directivity in the vertical direction for the subarrays 341 and 342. Further, the terminal apparatus 200 (the control unit 243) decides the weight set (PMI) for obtaining the directivity in the horizontal direction for the subarrays 343 and 344. Further, the terminal apparatus 200 (the control unit 243) decides the weight set (PMI) for obtaining the directivity in the horizontal direction and the vertical direction for the subarrays 345 and 346.

Accordingly, for example, the terminal apparatus 200 may not calculate a weight set for obtaining directivity for each subarray. Therefore, a load on the terminal apparatus 200 can be reduced. It is also possible to prevent different weight sets (different PMIs) from being decided between subarrays which are forming a directional beam in the same radiation direction.

(5) Report of Weight Set

As described above, the terminal apparatus 200 (the control unit 243) performs a report related to a combination of two or more subarrays included in the plurality of subarrays.

In the second modified example, for example, the report includes a report of the weight set for the group (that is, the weight set for obtaining the directivity). For example, the terminal apparatus 200 (the control unit 243) reports the weight set (PMI) for the group to the base station 100. For example, the terminal apparatus 200 (the control unit 243) reports the weight set (PMI) for obtaining the directivity to the base station 100 for each group of subarrays.

Further, for example, the terminal apparatus 200 also reports a weight set (PMI) for adjusting a phase between the two or more subarrays included in the group to the base station 100. For example, the terminal apparatus 200 reports the weight set (PMI) for obtaining the directivity and the weight set (PMI) for adjusting the phase between the subarrays to the base station 100 for each group of subarray.

Accordingly, for example, the information reported from the terminal apparatus 200 is decreased, and overhead can be decreased.

6.3. Third Modified Example

Next, a third modified example according to the embodiment of the present disclosure will be described with reference to FIGS. 24 and 25.

In the third modified example, the plurality of subarrays include a set of two or more subarrays including fewer antenna ports (fewer antenna elements) and a set of two or more subarrays including more than two antenna ports (more antenna elements). An example of a set of subarrays will be described below with reference to FIGS. 20 and 21.

Figure 24:
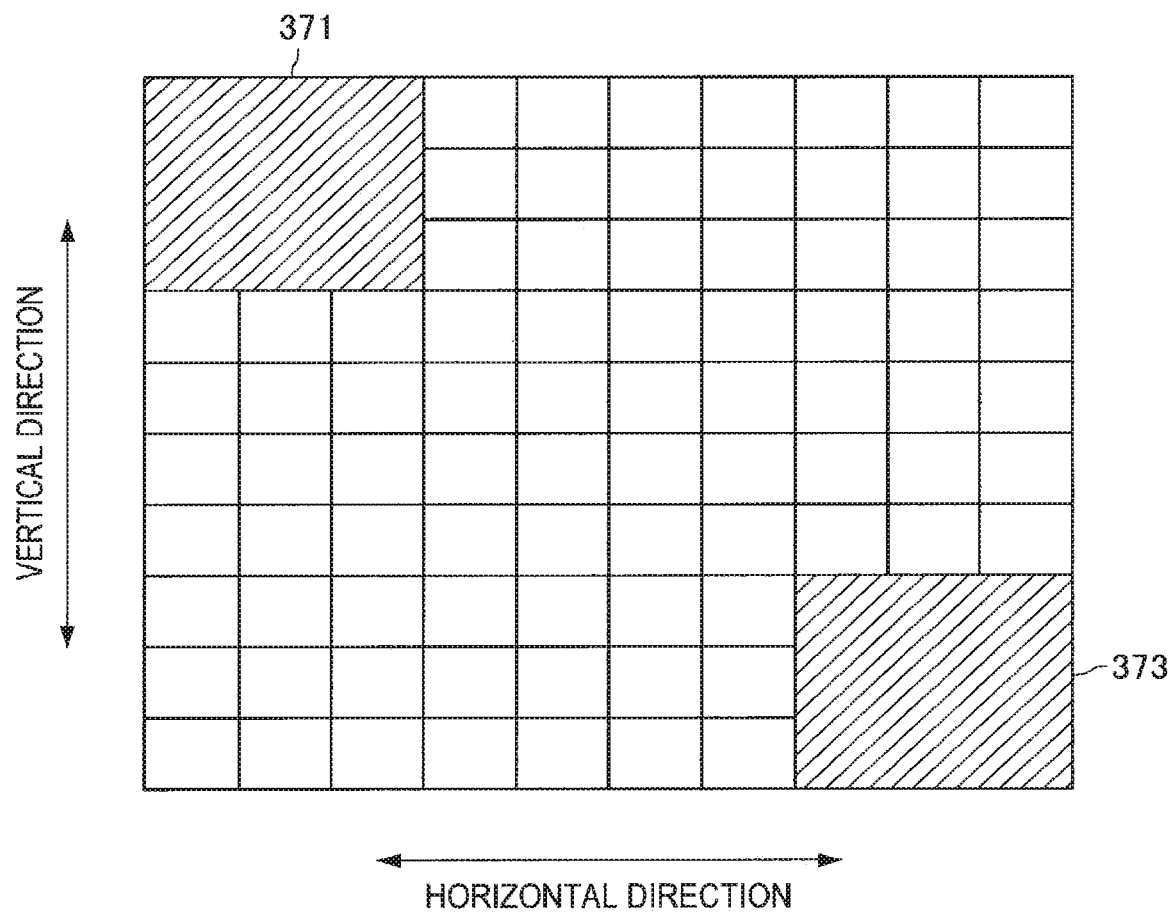
FIG. 24 is an explanatory diagram for describing an example of a set of subarrays including fewer antenna ports.

FIG. 24 is an explanatory diagram for describing an example of a set of subarrays including fewer antenna ports. Referring to FIG. 24, 10×10 antenna ports and a set of two subarrays 371 and 373 are illustrated. Each of the subarray 371 and the subarray 373 is a subarray including nine antenna ports. Since the subarray 371 and the subarray 373 include fewer antenna ports, they can be positioned apart from each other. In other words, it is possible to reduce a correlation between the subarray 371 and the subarray 373.

Figure 25:
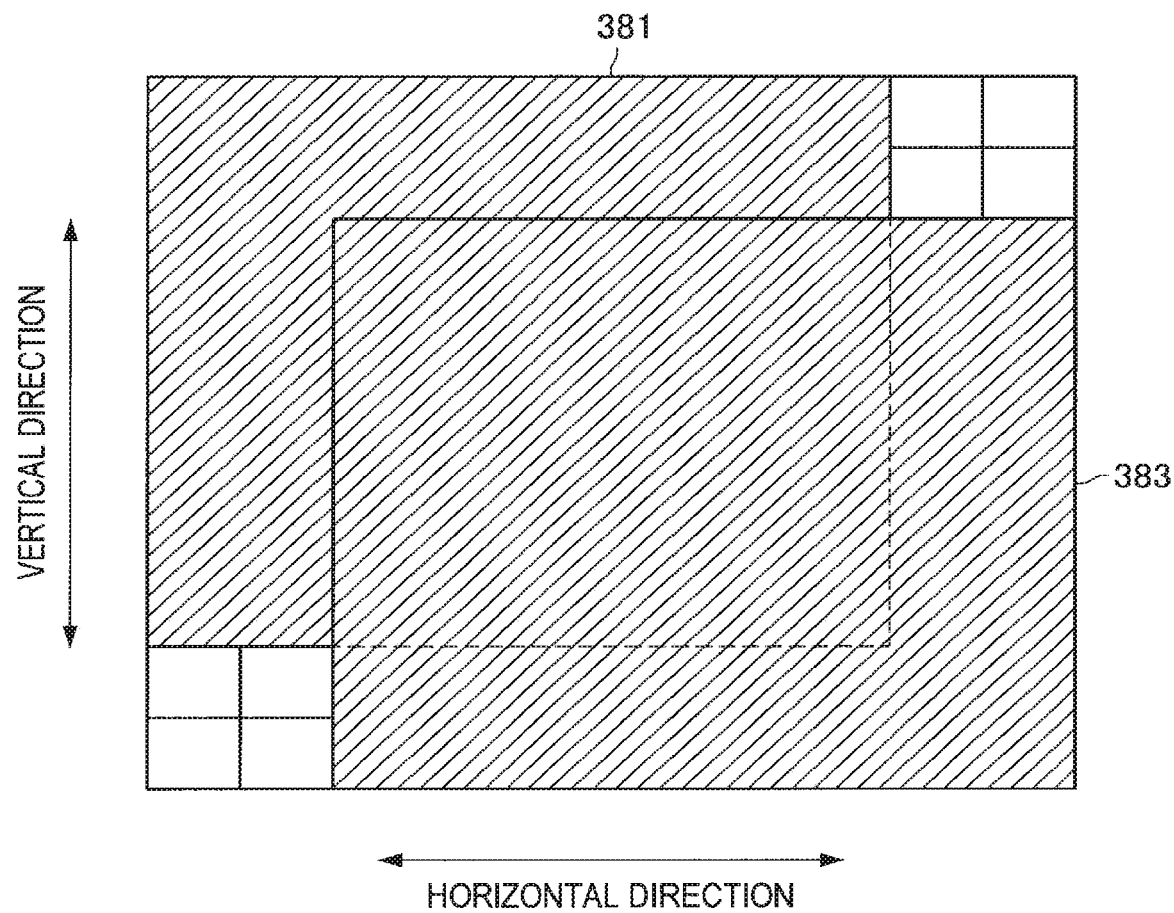
FIG. 25 is an explanatory diagram for describing an example of a set of subarrays including more antenna ports.

FIG. 25 is an explanatory diagram for describing an example of a set of subarrays including more antenna ports. Referring to FIG. 25, 10×10 antenna ports and a set of two subarrays 381 and 383 are illustrated. Each of the subarray 381 and the subarray 383 is a subarray including 64 antenna ports. Since the subarray 381 and the subarray 383 include more antenna ports, they are unable to be positioned apart from each other. Therefore, a correlation between the subarray 371 and the subarray 373 is large.

As an example, when the base station 100 can secure more layers (for example, a larger RI) using two or more subarrays including more antenna ports, the two or more subarrays including more antenna ports are used. Accordingly, for example, it is possible to form a sharp directional beam and suppress interference.

As another example, when the base station 100 is unable to secure more layers (for example, a large RI) using the two or more subarrays including more antenna ports, two or more subarrays including fewer antenna ports are used. Accordingly, for example, it is possible to secure more layers.

As described above, according to the third modified example, for example, a subarray appropriate for each individual terminal apparatus 200 can be selected. As a result, interference can be suppressed and/or more layers can be ensured.

7. Application Examples

The technique according to the present disclosure is applicable to various products. The base station 100 may also be implemented, for example, as any type of evolved Node B (eNB) such as macro eNBs and small eNBs. Small eNBs may cover smaller cells than the macrocells of pico eNBs, micro eNBs, or home (femt) eNBs. Instead, the base station 100 may be implemented as another type of base station such as Nodes B or base transceiver stations (BTSs). The base station 100 may include the main apparatus (which is also referred to as base station apparatus) that controls wireless communication and one or more remote radio heads (RRHs) that are disposed at different locations from that of the main apparatus. Also, various types of terminals described below may function as the base station 100 by temporarily or semi-permanently executing the functionality of the base station. Furthermore, at least some of components of the base station 100 may be realized in a base station apparatus or a module for a base station apparatus.

Further, the terminal apparatus 200 may be implemented as a mobile terminal such as smartphones, tablet personal computers (PCs), notebook PCs, portable game terminals, portable/dongle mobile routers, and digital cameras, or an in-vehicle terminal such as car navigation apparatuses. The terminal apparatus 200 may be implemented as a machine type communication (MTC) for establishing a machine to machine communication (M2M). Furthermore, at least some of components of the terminal apparatus 200 may be implemented as a module (e.g. integrated circuit module constituted with a single die) that is mounted on these terminals.

7.1. Application Examples for Base Station (1) First Application Example

Figure 26:
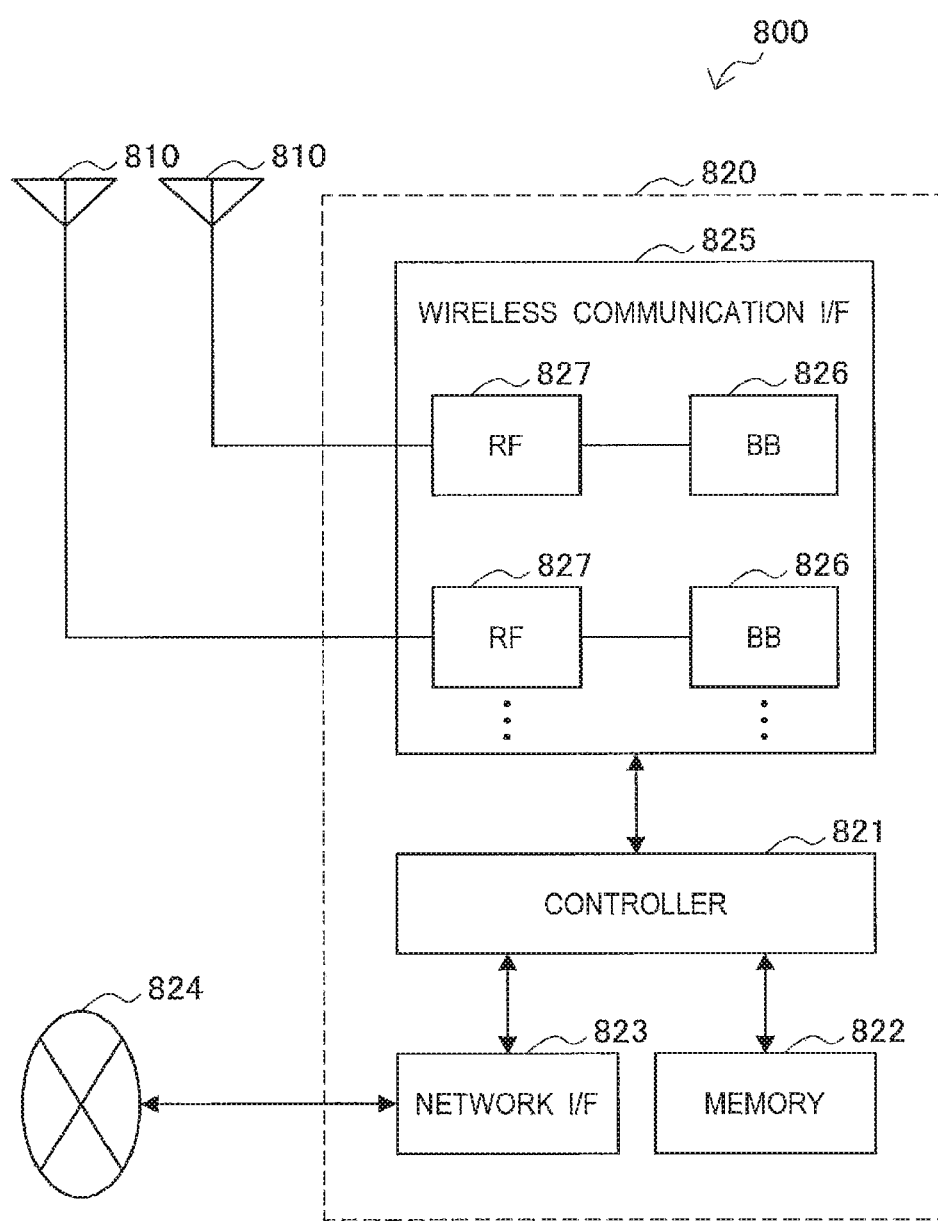
FIG. 26 is a block diagram illustrating a first example of a schematic configuration of an eNB.

FIG. 26 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g. a plurality of antenna elements constituting a MIMO antenna) and is used for the base station apparatus 820 to transmit and receive a wireless signal. The eNB 800 may include the plurality of the antennas 810 as illustrated in FIG. 26, and the plurality of antennas 810 may, for example, correspond to a plurality of frequency bands used by the eNB 800. It should be noted that while FIG. 26 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. The controller 821 may also have a logical function of performing control such as radio resource control, radio bearer control, mobility management, admission control, and scheduling. The control may be performed in cooperation with a surrounding eNB or a core network. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 may be connected to a core network node or another eNB through a logical interface (e.g. S1 interface or X2 interface). The network interface 823 may be a wired communication interface or a wireless communication interface for wireless backhaul. When the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826 and an RF circuit 827. The BB processor 826 may, for example, perform encoding/decoding, modulation/demodulation, multiplexing/demultiplexing, and the like, and performs a variety of signal processing on each layer (e.g. L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. The module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 26, and the plurality of BB processors 826 may, for example, correspond to a plurality of frequency bands used by the eNB 800. The wireless communication interface 825 may also include a plurality of the RF circuits 827, as illustrated in FIG. 26, and the plurality of RF circuits 827 may, for example, correspond to a plurality of antenna elements. FIG. 26 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 26, the information acquisition unit 151 and/or the control unit 153 described above with reference to FIG. 4 may be mounted in the wireless communication interface 825. Alternatively, at least some of the components may be mounted in the controller 821. As an example, the eNB 800 may be equipped with a module including some or all components of the wireless communication interface 825 (for example, the BB processor 826) and/or the controller 821, and the information acquisition unit 151 and/or the control unit 153 may be mounted in the module. In this case, the module may store a program causing the processor to function as the information acquisition unit 151 and/or the control unit 153 (that is, a program causing the processor to perform the operation of the information acquisition unit 151 and/or the control unit 153) and execute the program. As another example, the program causing the processor to function as the information acquisition unit 151 and/or the control unit 153 may be installed in the eNB 800, and the wireless communication interface 825 (for example, the BB processor 826) and/or the controller 821 may execute the program. As described above, the eNB 800, the base station apparatus 820, or the module may be provided as an apparatus including the information acquisition unit 151 and/or the control unit 153, and the program causing the processor to function as the information acquisition unit 151 and/or the control unit 153 may be provided. A readable recording medium in which the program is recorded may be provided.

In addition, in the eNB 800 shown in FIG. 26, the wireless communication unit 120 described with reference to FIG. 4 may be implemented by the wireless communication interface 825 (for example, the RF circuit 827). Moreover, the antenna unit 110 may be implemented by the antenna 810. In addition, the network communication unit 130 may be implemented by the controller 821 and/or the network interface 823.

(2) Second Application Example

Figure 27:
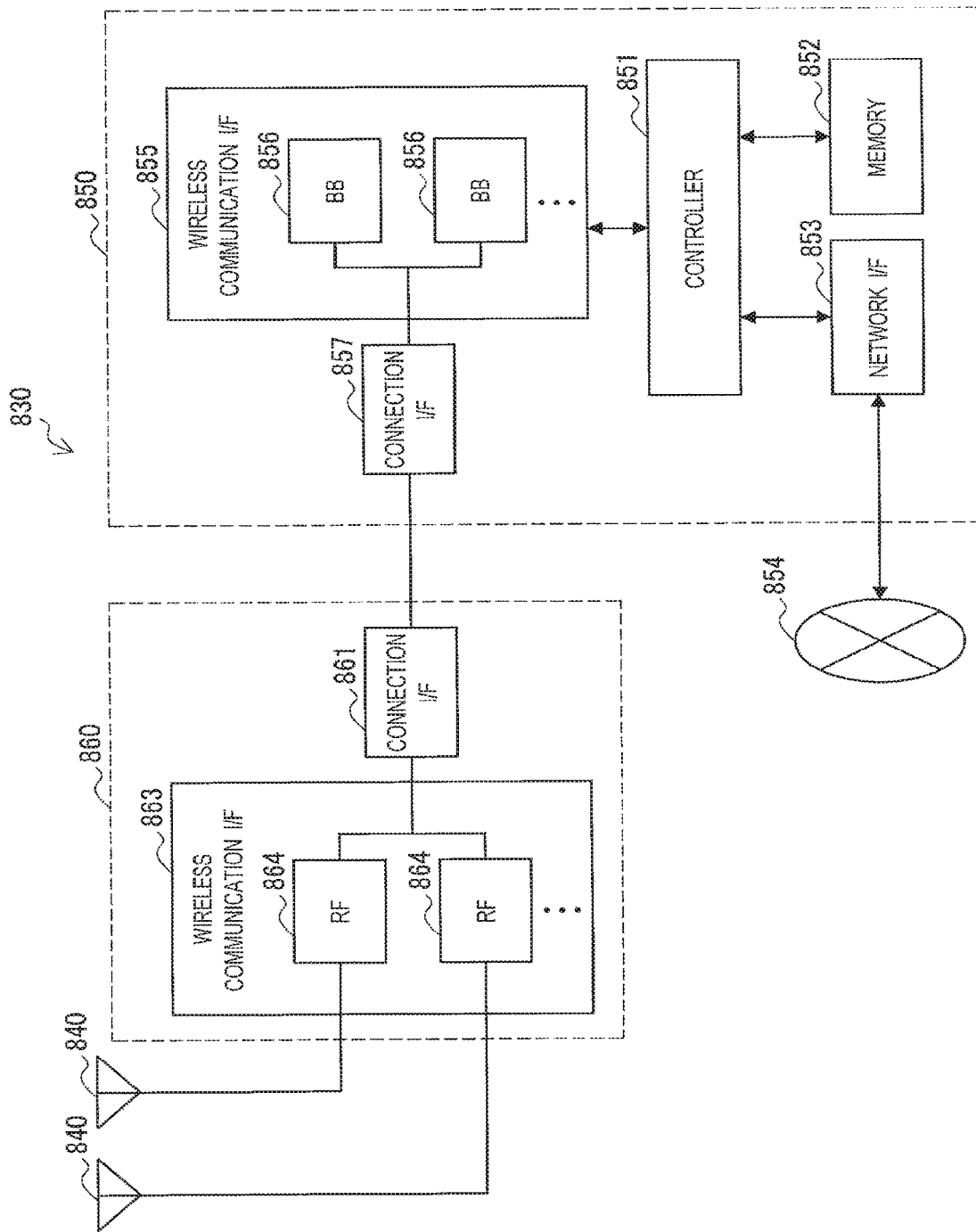
FIG. 27 is a block diagram illustrating a second example of the schematic configuration of the eNB.

FIG. 27 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. The base station apparatus 850 and the RRH 860 may be connected to each other by a high speed line such as optical fiber cables.

Each of the antennas 840 includes a single or a plurality of antenna elements (e.g. antenna elements constituting a MIMO antenna), and is used for the RRH 860 to transmit and receive a wireless signal. The eNB 830 may include a plurality of the antennas 840 as illustrated in FIG. 27, and the plurality of antennas 840 may, for example, correspond to a plurality of frequency bands used by the eNB 830. FIG. 27 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 26.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856. The BB processor 856 is the same as the BB processor 826 described with reference to FIG. 26 except that the BB processor 856 is connected to an RF circuit 864 of the RRH 860 via the connection interface 857. The wireless communication interface 855 may include a plurality of the BB processors 856, as illustrated in FIG. 27, and the plurality of BB processors 856 may, for example, correspond to a plurality of frequency bands used by the eNB 830 respectively. FIG. 27 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864. The RF circuit 864 may include a mixer, a filter, an amplifier and the like, and transmits and receives a wireless signal via the antenna 840. The wireless communication interface 863 may include a plurality of the RF circuits 864 as illustrated in FIG. 27, and the plurality of RF circuits 864 may, for example, correspond to a plurality of antenna elements. FIG. 27 illustrates an example in which the wireless communication interface 863 includes the plurality of RF circuits 864, but the wireless communication interface 863 may include the single RF circuit 864.

In the eNB 830 illustrated in FIG. 27, the information acquisition unit 151 and/or the control unit 153 described above with reference to FIG. 4 may be mounted in the wireless communication interface 855 and the wireless communication interface 863. Alternatively, at least some of the components may be mounted in the controller 851. As an example, the eNB 830 may be equipped with a module including some or all components of the wireless communication interface 855 (for example, the BB processor 856) and/or the controller 851, and the information acquisition unit 151 and/or the control unit 153 may be mounted in the module. In this case, the module may store a program causing the processor to function as the information acquisition unit 151 and/or the control unit 153 (that is, a program causing the processor to perform the operation of the information acquisition unit 151 and/or the control unit 153) and execute the program. As another example, the program causing the processor to function as the information acquisition unit 151 and/or the control unit 153 may be installed in the eNB 830, and the wireless communication interface 855 (for example, the BB processor 856) and/or the controller 851 may execute the program. As described above, the eNB 830, the base station apparatus 850, or the module may be provided as an apparatus including the information acquisition unit 151 and/or the control unit 153, and the program causing the processor to function as the information acquisition unit 151 and/or the control unit 153 may be provided. A readable recording medium in which the program is recorded may be provided.

In addition, in the eNB 830 shown in FIG. 27, the wireless communication unit 120 described with reference to FIG. 4 may be implemented by the wireless communication interface 863 (for example, the RF circuit 864). Moreover, the antenna unit 110 may be implemented by the antenna 840. In addition, the network communication unit 130 may be implemented by the controller 851 and/or the network interface 853.

7.2. Application Examples for Terminal Apparatus (1) First Application Example

Figure 28:
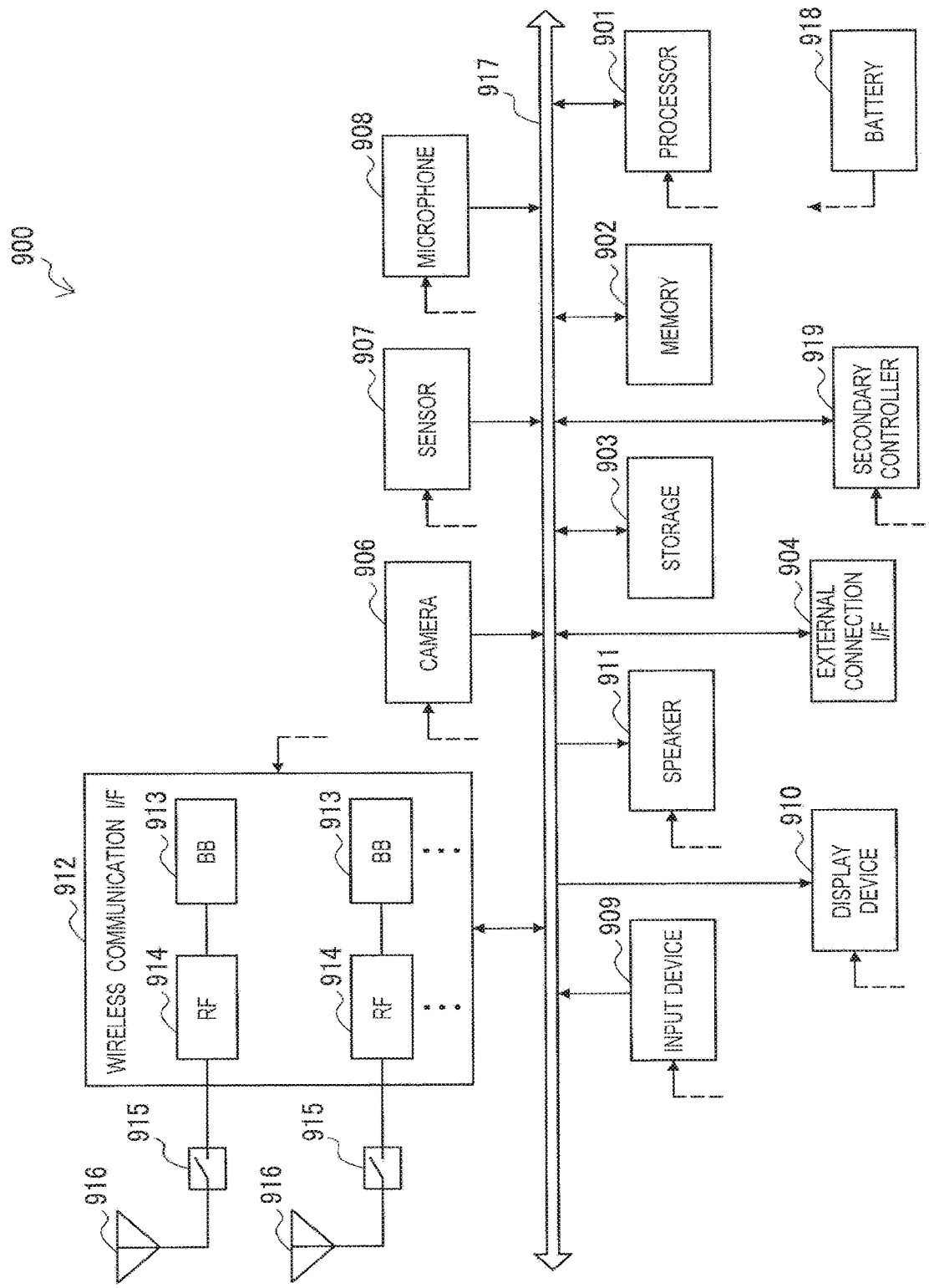
FIG. 28 is a block diagram illustrating an example of a schematic configuration of a smartphone.

FIG. 28 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and a secondary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, and an acceleration sensor. The microphone 908 converts a sound that is input into the smartphone 900 to an audio signal. The input device 909 includes, for example, a touch sensor which detects that a screen of the display device 910 is touched, a key pad, a keyboard, a button, or a switch, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 28. FIG. 28 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 28. FIG. 28 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the secondary controller 919 to each other.

The battery 918 supplies electric power to each block of the smartphone 900 illustrated in FIG. 28 via a feeder line that is partially illustrated in the figure as a dashed line. The secondary controller 919, for example, operates a minimally necessary function of the smartphone 900 in a sleep mode.

In the smartphone 900 illustrated in FIG. 28, the information acquisition unit 241 and/or the control unit 243 described above with reference to FIG. 5 may be mounted in the wireless communication interface 912. Alternatively, at least some of the components may be mounted in the processor 901 or the secondary controller 919. As an example, the smartphone 900 may be equipped with a module including some or all components of the wireless communication interface 912 (for example, the BB processor 913), the processor 901, and/or the secondary controller 919, and the information acquisition unit 241 and/or the control unit 243 may be mounted in the module. In this case, the module may store a program causing the processor to function as the information acquisition unit 241 and/or the control unit 243 (that is, a program causing the processor to perform the operation of the information acquisition unit 241 and/or the control unit 243) and execute the program. As another example, the program causing the processor to function as the information acquisition unit 241 and/or the control unit 243 may be installed in the smartphone 900, and the wireless communication interface 912 (for example, the BB processor 913), the processor 901, and/or the secondary controller 919 may execute the program. As described above, the smartphone 900 or the module may be provided as an apparatus including the information acquisition unit 241 and/or the control unit 243, and the program causing the processor to function as the information acquisition unit 241 and/or the control unit 243 may be provided. A readable recording medium in which the program is recorded may be provided.

In addition, in the smartphone 900 shown in FIG. 28, the wireless communication unit 220 described with reference to FIG. 5 may be implemented by the wireless communication interface 912 (for example, the RF circuit 914). Moreover, the antenna unit 210 may be implemented by the antenna 916.

(2) Second Application Example

Figure 29:
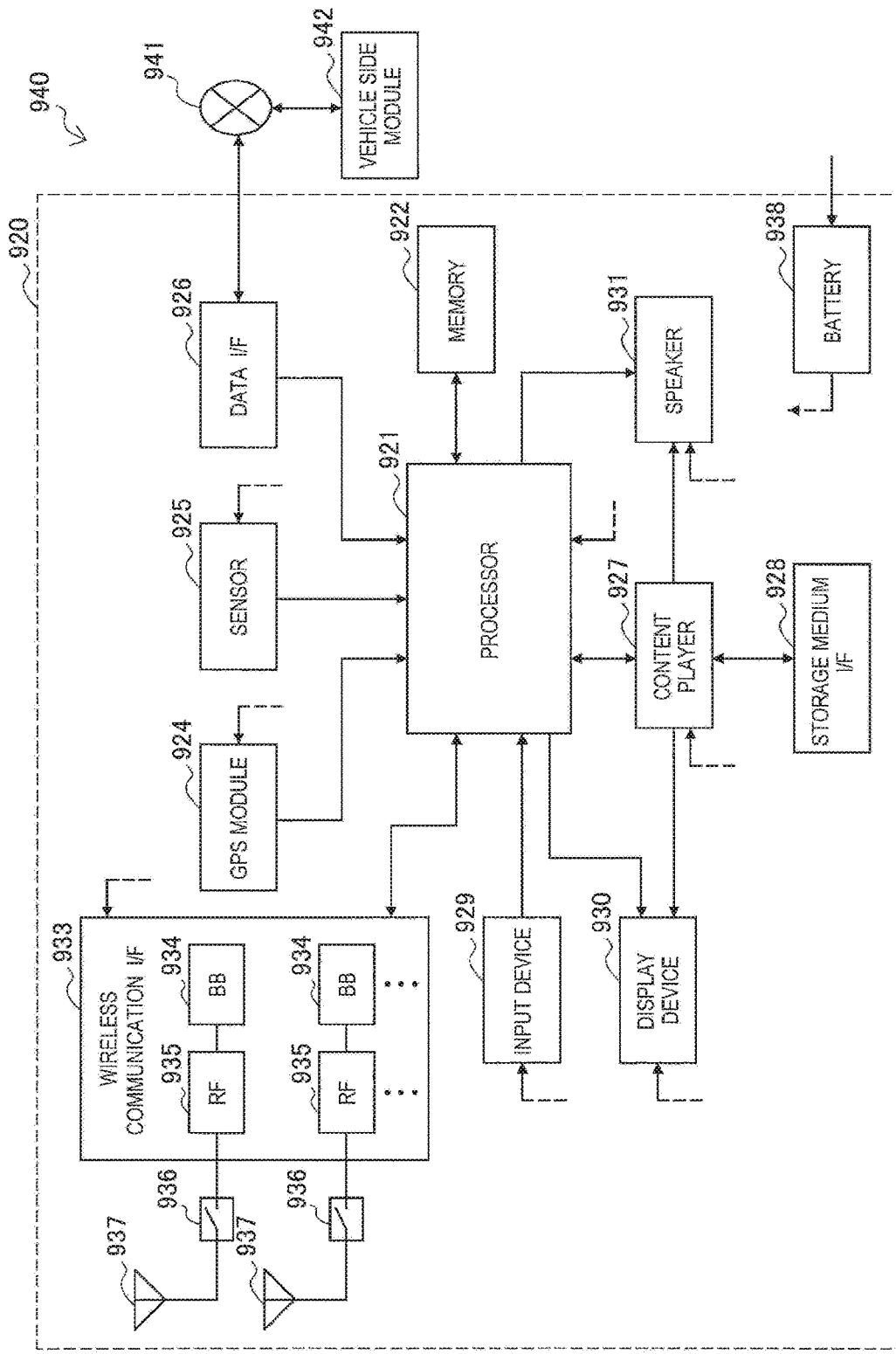
FIG. 29 is a block diagram illustrating an example of a schematic configuration of a car navigation apparatus.

FIG. 29 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g. latitude, longitude, and altitude) of the car navigation apparatus 920. The sensor 925 may include a sensor group including, for example, a gyro sensor, a geomagnetic sensor, and a barometric sensor. The data interface 926 is, for example, connected to an in-vehicle network 941 via a terminal that is not illustrated, and acquires data such as vehicle speed data generated on the vehicle side.

The content player 927 reproduces content stored in a storage medium (e.g. CD or DVD) inserted into the storage medium interface 928. The input device 929 includes, for example, a touch sensor which detects that a screen of the display device 930 is touched, a button, or a switch, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 29. FIG. 29 illustrates an example in which the wireless communication interface 933 includes a plurality of BB processors 934 and a plurality of RF circuits 935, but the wireless communication interface 933 may be a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 includes a plurality of antennas 937 as illustrated in FIG. 29. FIG. 29 illustrates an example in which the car navigation apparatus 920 includes a plurality of antennas 937, but the car navigation apparatus 920 may include a single antenna 937.

Further, the smartphone 920 may include the antenna 937 for each wireless communication system. In this case, the antenna switch 936 may be omitted from a configuration of the car navigation apparatus 920.

The battery 938 supplies electric power to each block of the car navigation apparatus 930 illustrated in FIG. 29 via a feeder line that is partially illustrated in the figure as a dashed line. The battery 938 accumulates the electric power supplied from the vehicle.

In the car navigation apparatus 920 illustrated in FIG. 29, the information acquisition unit 241 and/or the control unit 243 described above with reference to FIG. 5 may be mounted in the wireless communication interface 933. Alternatively, at least some of the components may be mounted in the processor 921. As an example, the car navigation apparatus 920 may be equipped with a module including some or all components of the wireless communication interface 933 (for example, the BB processor 934), and the information acquisition unit 241 and/or the control unit 243 may be mounted in the module. In this case, the module may store a program causing the processor to function as the information acquisition unit 241 and/or the control unit 243 (that is, a program causing the processor to perform the operation of the information acquisition unit 241 and/or the control unit 243) and execute the program. As another example, the program causing the processor to function as the information acquisition unit 241 and/or the control unit 243 may be installed in the car navigation apparatus 920, and the wireless communication interface 933 (for example, the BB processor 934) and/or the processor 921 may execute the program. As described above, the car navigation apparatus 920 or the module may be provided as an apparatus including the information acquisition unit 241 and/or the control unit 243, and the program causing the processor to function as the information acquisition unit 241 and/or the control unit 243 may be provided. A readable recording medium in which the program is recorded may be provided.

In addition, in the car navigation apparatus 920 shown in FIG. 29, the wireless communication unit 220 described with reference to FIG. 5 may be implemented by the wireless communication interface 933 (for example, the RF circuit 935). Moreover, the antenna unit 210 may be implemented by the antenna 937.

The technology of the present disclosure may also be realized as an in-vehicle system (or a vehicle) 940 including one or more blocks of the car navigation apparatus 920, the in-vehicle network 941, and a vehicle module 942. In other words, the in-vehicle system (or a vehicle) 940 may be provided as a device which includes the information acquisition unit 241 and/or the control unit 243. The vehicle side module 942 generates vehicle data such as vehicle speed, engine speed, and trouble information, and outputs the generated data to the in-vehicle network 941.

8. Conclusion

So far, each of devices and processes according to embodiments of the present disclosure have been described with reference to FIGS. 3 to 29.

According to the embodiments of the present disclosure, the base station 100 includes the information acquiring unit 151 that acquires subarray information indicating a plurality of subarrays usable for multilayer MIMO and the control unit that notifies the terminal apparatus of the subarray information.

According to the embodiments of the present disclosure, the terminal apparatus 200 includes the information acquiring unit 151 that acquires subarray information indicating a plurality of subarrays usable for multilayer MIMO and the control unit 243 that performs a report related to a combination of two or more subarrays included in the plurality of subarrays.

Accordingly, for example, it is possible to use a combination of subarrays desirable for multilayer MIMO.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although an example is described in which the system is a system that is compliant with LTE, LTE-Advanced, or a communication scheme that conforms to them, the present disclosure is not limited to such an example. For example, the system may be a system that conforms to another communication standard.

Further, it is not always necessary to execute the processing steps in the processing in the present specification in chronological order in order described in the flowcharts or the sequence diagrams. For example, the processing steps in the above-described processing may be executed in order different from the order described in the flowcharts or the sequence diagrams or may be executed in parallel.

In addition, a computer program for causing a processor (for example, a CPU, a DSP, or the like) provided in a device of the present specification (for example, a base station, a base station apparatus or a module for a base station apparatus, or a terminal apparatus or a module for a terminal apparatus) to function as a constituent element of the device (for example, the information acquiring unit, the control unit, and the like) (in other words, a computer program for causing the processor to execute operations of the constituent element of the device) can also be created. In addition, a recording medium in which the computer program is recorded may also be provided. Further, a device that includes a memory in which the computer program is stored and one or more processors that can execute the computer program (a base station, a base station apparatus or a module for a base station apparatus, or a terminal apparatus or a module for a terminal apparatus) may also be provided. In addition, a method including an operation of the constituent element of the device (for example, the information acquiring unit, the communication control unit, and the like) is also included in the technology of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An apparatus, including: an acquiring unit configured to acquire subarray information indicating a plurality of subarrays usable for multilayer Multi-Input Multi-Output (MIMO); and a control unit configured to notify a terminal apparatus of the subarray information.

(2)
The apparatus according to (1),
in which the subarray information includes information indicating an antenna port included in each of the plurality of subarrays.

(3)
The apparatus according to (1) or (2),
in which the subarray information includes identification information identifying each of the plurality of subarrays.

(4)
The apparatus according to any one of (1) to (3),
in which the acquiring unit acquires first number information indicating the number of subarrays to be combined for the multilayer MIMO, and
the control unit notifies the terminal apparatus of the first number information.

(5)
The apparatus according to any one of (1) to (4),
in which the terminal apparatus is a terminal apparatus that performs a report related to a combination of two or more subarrays included in the plurality of subarrays,
the acquiring unit acquires second number information indicating the number of combinations of subarrays to be reported, and
the control unit notifies the terminal apparatus of the second number information.

(6)
The apparatus according to any one of (1) to (5),
in which the plurality of subarrays includes two or more subarrays that share one or more antenna ports.

(7)
The apparatus according to any one of (1) to (6),
in which the acquiring unit acquires combination candidate information indicating one or more combination candidates of two or more subarrays included in the plurality of sub arrays, and
the control unit notifies the terminal apparatus of the combination candidate information.

(8)
The apparatus according to (7),
in which the combination candidate information indicates two or more combination candidates of two or more subarrays included in the plurality of subarrays,
the acquiring unit acquires priority information indicating priorities of the two or more combination candidates, and the control unit notifies the terminal apparatus of the priority information.

(9)
The apparatus according to any one of (1) to (8),
in which the terminal apparatus is a terminal apparatus that performs a report related to a combination of two or more subarrays included in the plurality of subarrays, and
the control unit decides a combination of two or more subarrays to be used for the multilayer MIMO for the terminal apparatus on the basis of the report performed by the terminal apparatus.

(10)
The apparatus according to (9),
in which the combination of the two or more subarrays to be used for the multilayer MIMO for the terminal apparatus does not include more than a predetermined number of subarrays that share one or more antenna ports.

(11)
The apparatus according to any one of (1) to (10),
in which the acquiring unit acquires group information indicating a group of two or more subarrays forming a directional beam in the same radiation direction in the multilayer MIMO among the plurality of subarrays, and
the control unit notifies the terminal apparatus of the group information.

(12)
An apparatus, including:
an acquiring unit configured to acquire subarray information indicating a plurality of subarrays usable for multilayer MIMO; and
a control unit configured to perform a report related to a combination of two or more subarrays included in the plurality of subarrays.

(13)
The apparatus according to (12),
in which the control unit selects a combination of two or more subarrays desirable for the multilayer MIMO from among the plurality of subarrays, and
the report includes a report of the combination of the two or more subarrays desirable for the multilayer MIMO.

(14)
The apparatus according to (12) or (13),
in which the report includes a report of a weight set for the combination of the two or more subarrays.

(15)
The apparatus according to (14),
in which the weight set includes a weight set for adjusting a phase between the two or more subarrays.

(16)
The apparatus according to any one of (12) to (15),
in which the report includes a report of the number of layers for the combination of the two or more subarrays.

(17)
The apparatus according to any one of (12) to (16),
in which the report includes a report of a channel quality for the combination of the two or more subarrays.

(18)
The apparatus according to any one of (12) to (17),
in which the acquiring unit acquires combination candidate information indicating one or more combination candidates of two or more subarrays included in the plurality of sub arrays, and
the report is a report related to a combination included in the one or more combination candidates.

(19)
The apparatus according to (18),
in which the combination candidate information indicates two or more combination candidates of two or more subarrays included in the plurality of subarrays,
the acquiring unit acquires priority information indicating priorities of the two or more combination candidates, and
the control unit performs a report related to a combination included in the two or more combination candidates on the basis of the priority information.

(20)
The apparatus according to any one of (12) to (19),
in which the acquiring unit acquires group information indicating a group of two or more subarrays forming a directional beam in the same radiation direction in the multilayer MIMO among the plurality of subarrays, and
the control unit decides a weight set for obtaining directivity for the group on the basis of the group information.

(21)

The apparatus according to any one of (1) to (11),
in which the apparatus is a base station, a base station apparatus for the base station or a module for the base station apparatus.

(22)

The apparatus according to any one of (12) to (20),
in which the apparatus is a terminal apparatus or a module for the terminal apparatus.

(23)

A method, including:
acquiring, by a processor, subarray information indicating a plurality of subarrays usable for multilayer Multi-Input Multi-Output (MIMO); and
notifying, by the processor, a terminal apparatus of the subarray information.

(24)

A program causing a processor to execute:
acquiring subarray information indicating a plurality of subarrays usable for multilayer Multi-Input Multi-Output (MIMO); and
notifying a terminal apparatus of the subarray information.

(25)

A readable recording medium having a program recorded thereon, the program causing a processor to execute:
acquiring subarray information indicating a plurality of subarrays usable for multilayer Multi-Input Multi-Output (MIMO); and
notifying a terminal apparatus of the subarray information.

(26)

A method, including:
acquiring, by a processor, subarray information indicating a plurality of subarrays usable for multilayer MIMO; and
performing, by the processor, a report related to a combination of two or more subarrays included in the plurality of subarrays.

(27)

A program causing a processor to execute:
acquiring subarray information indicating a plurality of subarrays usable for multilayer MIMO; and
performing a report related to a combination of two or more subarrays included in the plurality of subarrays.

(28)

A readable recording medium having a program recorded thereon, the program causing a processor to execute:
acquiring subarray information indicating a plurality of subarrays usable for multilayer MIMO; and
performing a report related to a combination of two or more subarrays included in the plurality of subarrays.

REFERENCE SIGNS LIST 1 system
30 subarray configuration
31 subarray information
33 first number information
34 second number information
35 third number information
37 combination candidate information
39 priority information
41 group information
50 report information
51 combination information
53 channel state information
100 base station
101 cell
151 information acquiring unit
153 control unit
200 terminal apparatus
241 information acquiring unit
243 control unit

The invention claimed is:

1. An apparatus, comprising:
a processor configured to:
communicate with a terminal apparatus by multilayer Multi-Input Multi-Output (MIMO);
notify the terminal apparatus of information related to at least a subarray by radio resource control signaling, wherein the subarray information includes information indicating a number of antenna ports included in the subarray, and wherein the subarray information is selected from a plurality of subarrays which includes two or more subarrays that share one or more antenna ports;
acquire combination candidate information indicating one or more combination candidates of two or more subarrays included in the plurality of subarrays;
notify the terminal apparatus of the combination candidate information;
receive report information from the terminal apparatus, wherein the report information includes an indicator indicating a precoding matrix related to the subarray; and
select a precoding matrix based on the indicator.

2. The apparatus according to claim 1, wherein the indicator is selected based on the received antenna port subarray information.

3. The apparatus according to claim 1,
wherein the processor is further configured to:
acquire first number information indicating a number of subarrays to be combined for the multilayer MIMO; and
notify the terminal apparatus of the first number information.

4. The apparatus according to claim 3,
wherein the processor is further configured to:
acquire second number information indicating a number of combinations of subarrays to be reported; and
notify the terminal apparatus of the second number information.

5. The apparatus according to claim 1,
wherein the combination candidate information indicates two or more combination candidates of two or more subarrays included in the plurality of subarrays, and
wherein the processor is further configured to:
acquire priority information indicating priorities of the two or more combination candidates; and
notify the terminal apparatus of the priority information.

6. The apparatus according to claim 1,
wherein the processor is further configured to:
acquire group information indicating a group of two or more subarrays forming a directional beam in the same radiation direction in the multilayer MIMO among the plurality of subarrays; and
notify the terminal apparatus of the group information.

7. An apparatus, comprising:
a processor configured to:
communicate with a base station by multilayer MIMO;
acquire information related to at least a subarray from the base station by radio resource control signaling, wherein the subarray information includes information indicating the number of antenna ports included in a plurality of subarrays and the plurality of subarrays includes two or more subarrays that share one or more antenna ports;

transmit report information including an indicator indicating a precoding matrix for the subarray, wherein, the indicator is used to decide a precoding matrix by the base station;

acquire group information indicating a group of two or more subarrays forming a directional beam in the same radiation direction in the multilayer MIMO among the plurality of subarrays; and decide a weight set for obtaining directivity for the group on the basis of the group information.

8. The apparatus according to claim 7,
wherein the processor is further configured to:
select a combination of two or more subarrays desirable for the multilayer MIMO from among the plurality of subarrays; and
wherein the report includes a report of the combination of the two or more subarrays desirable for the multilayer MIMO.

9. The apparatus according to claim 7,
wherein the report includes a report of a weight set for the combination of the two or more subarrays.

10. The apparatus according to claim 8,
wherein the weight set includes a weight set for adjusting a phase between the two or more subarrays.

11. The apparatus according to claim 7,
wherein the report includes a report of a channel quality for the combination of the two or more subarrays.

12. A method, implemented in circuitry, comprising:
communicating, by the circuitry, with a terminal apparatus by multilayer Multi-Input Multi-Output (MIMO);
notifying, by the circuitry, the terminal apparatus of information related to at least a subarray by radio resource control signaling, wherein the subarray information includes information indicating a number of antenna ports included in the subarray, and wherein the subarray information is selected from a plurality of subarrays which includes two or more subarrays that share one or more antenna ports;

acquiring, by the circuitry, combination candidate information indicating one or more combination candidates of two or more subarrays included in the plurality of subarrays;

notifying, by the circuitry, the terminal apparatus of the combination candidate information;

receiving, by the circuitry, report information from the terminal apparatus, wherein the report information includes an indicator indicating a precoding matrix related to the subarray; and selecting, by the circuitry, a precoding matrix based on the indicator.

13. The method of claim 12, wherein the indicator is selected based on the received antenna port subarray information.

14. The method of claim 12, further comprising:
acquiring, by the circuitry, first number information indicating a number of subarrays to be combined for the multilayer MIMO; and
notifying, by the circuitry, the terminal apparatus of the first number information.

15. The method of claim 14, further comprising:
acquiring, by the circuitry, second number information indicating a number of combinations of subarrays to be reported; and
notifying, by the circuitry, the terminal apparatus of the second number information.

16. The method of claim 12, wherein the combination candidate information indicates two or more combination candidates of two or more subarrays included in the plurality of subarrays, the method further comprising:
acquiring, by the circuitry, priority information indicating priorities of the two or more combination candidates; and
notifying, by the circuitry, the terminal apparatus of the priority information.

17. The method of claim 12, further comprising:
acquiring, by the circuitry, group information indicating a group of two or more subarrays forming a directional beam in the same radiation direction in the multilayer MIMO among the plurality of subarrays; and
notifying, by the circuitry, the terminal apparatus of the group information.

* * * * *